(12) United States Patent
Tanaka et al.

(10) Patent No.: US 12,483,362 B2
(45) Date of Patent: Nov. 25, 2025

(54) WIRELESS BASE STATION

(71) Applicant: SONY GROUP CORPORATION, Tokyo (JP)

(72) Inventors: Ken Tanaka, Tokyo (JP); Kosuke Aio, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 517 days.

(21) Appl. No.: 17/995,419

(22) PCT Filed: Feb. 17, 2021

(86) PCT No.: PCT/JP2021/005896
§ 371 (c)(1),
(2) Date: Oct. 4, 2022

(87) PCT Pub. No.: WO2021/210263
PCT Pub. Date: Oct. 21, 2021

(65) Prior Publication Data
US 2023/0171050 A1   Jun. 1, 2023

(30) Foreign Application Priority Data

Apr. 13, 2020   (JP) ................................. 2020-071626

(51) Int. Cl.
*H04L 5/00*   (2006.01)
*H04W 24/02*   (2009.01)

(52) U.S. Cl.
CPC ........... *H04L 5/0035* (2013.01); *H04W 24/02* (2013.01)

(58) Field of Classification Search
CPC ............................. H04L 5/0035; H04W 24/02
See application file for complete search history.

(56) References Cited

U.S. PATENT DOCUMENTS

| 8,630,267 B1* | 1/2014 | Jin ................... H04L 25/03955 370/332 |
| 2010/0298006 A1* | 11/2010 | Ko ........................ H04B 7/022 455/452.2 |
| 2019/0089453 A1* | 3/2019 | Shiobara ............... H04L 5/0091 |

FOREIGN PATENT DOCUMENTS

| JP | 2013-098807 A | 5/2013 |
| JP | 2013-229661 A | 11/2013 |

(Continued)

OTHER PUBLICATIONS

International Search Report and Written Opinion of PCT Application No. PCT/JP2021/005896, issued on May 18, 2021, 10 pages of ISRWO.

(Continued)

*Primary Examiner* — Erika A Washington
(74) *Attorney, Agent, or Firm* — CHIP LAW GROUP

(57) ABSTRACT

The present technology improves an effective rate in a case where joint transmission is performed once in multi-APs that perform joint transmission, and then a weight is changed and joint transmission is performed again. A wireless base station includes a wireless control unit and a communication unit. The wireless control unit generates weight update information for updating a first weight to a second weight, the first weight being a weight used in joint transmission previously performed with another wireless base station, the second weight being a weight used for performing the joint transmission after the joint transmission using the first weight. The communication unit notifies the another wireless base station of the weight update information.

19 Claims, 9 Drawing Sheets

(56) References Cited

FOREIGN PATENT DOCUMENTS

JP        2013-541261 A    11/2013
WO       2017/145636 A1    8/2017

OTHER PUBLICATIONS

Aio, et al., "Consideration on Multi-AP Sounding", Institute of Electrical and Electronics Engineers, IEEE 802.11-19/1134r1, Aug. 9, 2019, 14 pages.

* cited by examiner

*FIG. 4*

CAPABILITIES EXCHANGE
(Capabilities Exchange)

| FRAME CONTROL (Frame Control) | RECEIVER ADDRESS (RA) | TRANSMITTER ADDRESS (TA) | ... | EHT CAPABILITIES (EHT Capabilities) | |

| ELEMENT ID (Element ID) | LENGTH (Length) | ... | JOINT TRANSMISSION (Joint Trans.) | WEIGHT UPDATE (Weight Update) | ... |

WIRELESS BASE STATION

CROSS REFERENCE TO RELATED APPLICATIONS

This application is a U.S. National Phase of International Patent Application No. PCT/JP2021/005896 filed on Feb. 17, 2021, which claims priority benefit of Japanese Patent Application No. JP 2020-071626 filed in the Japan Patent Office on Apr. 13, 2020. Each of the above-referenced applications is hereby incorporated herein by reference in its entirety.

TECHNICAL FIELD

The present technology relates to a wireless base station and a wireless terminal. Specifically, the present technology relates to a wireless base station and a wireless terminal in a wireless system including a plurality of wireless base stations that perform joint transmission.

BACKGROUND ART

In a wireless LAN, an access point (AP or BS) and a user terminal (STA or UE) autonomously obtain a transmission right in a single basic service set (BSS) and perform communication. In a case where a transmission terminal includes a plurality of antennas, an appropriate weight is multiplied in a transmission antenna and reception antenna in transmission in which the plurality of antennas is simultaneously used (multiple input multiple output: MIMO), thereby forming directivity in a desired direction (hereinafter, beamforming: BF). Therefore, it is possible not only to perform high gain transmission to a desired receiver terminal, but also to simultaneously communicate with a plurality of terminals. This makes it possible to improve a system throughput in the BSS.

In order to perform beamforming, it is necessary to determine in advance the weight to be multiplied in the transmission antenna on the basis of channel state information between the transmission antenna of the transmission terminal and a reception antenna of a reception terminal. In order to implement beamforming, an AP that performs beamforming needs to estimate the channel state information in advance.

As an example of a framework for determining the weight in the AP, "IEEE 802.11-2016" defines explicit feedback beamforming and implicit feedback beamforming. In explicit feedback beamforming, the AP performs transmission of a known signal or reference signal to an STA (hereinafter, sounding), whereas, in implicit feedback beamforming, sounding is performed from the STA to the AP. Note that, in "IEEE 802.11-2016", the weight is also referred to as a matrix of steering vectors or steering matrix.

In explicit feedback beamforming, the STA that receives the above-described known signal or reference signal estimates the channel state information. Then, the STA feeds back the estimated channel state information to the AP, and the AP calculates a weight used in beamforming on the basis of the fed back information. Meanwhile, in implicit feedback beamforming, the AP directly estimates the channel state information on the basis of sounding by the STA and calculates the weight. However, strictly speaking, it is difficult to directly obtain the channel state information in sounding. In addition, the estimation is performed under the influence of a circuit, and thus the weight is also calculated under the influence of the circuit. In beamforming, the AP uses a transmission circuit, and the STA uses a reception circuit. Meanwhile, in sounding for implicit feedback beamforming, the AP uses a reception circuit, and the STA uses a transmission circuit. Thus, different circuits are influenced. Therefore, in implicit feedback beamforming, calibration for correcting the influence of the circuits is additionally required.

In explicit feedback beamforming, a large amount of information (hereinafter, overhead) of a channel is fed back from the STA to the AP, and thus there is a problem that an effective rate is hardly improved due to the overhead even if a peak rate is improved by beamforming. However, the channel state information does not need to be fed back every time beamforming is performed. This is because, for example, in a propagation environment with little time variation, even if the channel state information is not fed back or the weight is not calculated every time beamforming is performed, it is possible to obtain an equivalent peak rate by using the channel state information fed back previously to calculate the weight and perform beamforming, as compared with a case where the latest weight is used every time.

The peak rate can be further improved by extending such beamforming and performing joint transmission (JT) by beamforming coordinated by a plurality of APs (hereinafter, multi-APs) coordinating with each other. There are a plurality of joint transmission methods, and, in particular, coherent joint transmission (CJT) in which APs perform transmission as a single virtual AP having antennas corresponding to the sum of antennas of the APs can achieve the highest peak rate.

It is proposed to transmit a trigger immediately before sounding when such joint transmission is performed (see, for example, Non-Patent Document 1). This related art also discloses that channel state information estimated by an STA is fed back to an AP serving as a subject for determining a weight.

CITATION LIST

Non-Patent Document

Non-Patent Document 1: Kosuke Aio, et al., "Consideration on Multi-AP Sounding," doc.: IEEE 802.11-19/1134r1 9 Aug. 2019

SUMMARY OF THE INVENTION

Problems to be Solved by the Invention

In the joint transmission described above, it is assumed that the AP serving as a subject for determining a weight (sharing AP) notifies, of the weight, the multi-APs (shared APs) other than the sharing AP that performs CJT. In a case where the related art is used as a notification method of the weight, there is a concern about a decrease in effective rate due to an overhead of notification of the weight. In particular, in a case where the weight to be applied to each AP included in the multi-APs is changed when the CJT is performed again after the CJT is performed once, the shared APs need to receive a notification of the changed weight from the sharing AP each time.

As a specific example, this corresponds to a case where, when simultaneous transmission is performed on a plurality of STAs by the CJT (hereinafter, CJT downlink multi user multiple input multiple output: "CJT DL MU MIMO"), the number of users serving as receivers is changed or transmission power to be allocated to the users is changed every time communication is performed. In the "CJT DL MU MIMO", it is generally necessary to apply weights to users serving as receivers so as to reduce interference between the users. Therefore, in particular, in a case where the users serving as the receivers are changed, the interference cannot be reduced unless the weights are appropriately set again. Thus, communication quality deteriorates.

In a case of MIMO transmission using a single AP, a weight is calculated and changed every time beamforming is performed by the AP itself on the basis of estimated channel state information and beamforming can be performed. In the CJT, however, beamforming cannot be changed for the CJT unless the sharing AP notifies the AP of the weight. Therefore, in the CJT, there is a problem that an overhead caused by notification of the weight occurs every time the weight is changed, which reduces the effective rate.

The present technology has been made in view of such a situation, and an object thereof is to improve the effective rate in a case where joint transmission is performed once in multi-APs that perform joint transmission, and then a weight is changed and joint transmission is performed again.

Solutions to Problems

The present technology has been made to solve the problems described above, and a first aspect thereof is a wireless base station including: a wireless control unit configured to generate weight update information for updating a first weight to a second weight, the first weight being a weight used in joint transmission previously performed with another wireless base station, the second weight being a weight used for performing the joint transmission after the joint transmission using the first weight; and a communication unit configured to notify the another wireless base station of the weight update information. Therefore, it is possible to notify the another wireless base station of the weight update information for updating the first weight to the second weight.

Further, in the first aspect, the wireless control unit may generate capability information for determining whether or not the joint transmission can be performed in the wireless base station and regarding an algorithm usable for updating the first weight to the second weight, and the communication unit may notify the another wireless base station of the capability information. Therefore, the another wireless base station can be notified of the capability information before being notified of the weight update information.

Further, in the first aspect, the wireless control unit may generate target data for performing the joint transmission by using the second weight, and the communication unit may transmit the weight update information including the target data to the another wireless base station. Therefore, it is possible to simultaneously perform notification of the weight update information and sharing of the data.

Further, in the first aspect, the weight update information may include information indicating that the weight update information includes the target data. Therefore, it is possible to cause the another wireless base station to determine whether or not the target data is included.

Further, in the first aspect, the weight update information may include information for updating the weight to the second weight for the another wireless base station and for each receiver terminal of the joint transmission and further include index information for identifying the another wireless base station and each receiver terminal. Therefore, the information for updating the weight to the second weight can be individually identified.

Further, in the first aspect, the index information may include information regarding the number of the other wireless base stations and information for identifying each of the other wireless base stations. Therefore, the information for updating the weight to the second weight can be identified for each wireless base station.

Further, in the first aspect, the weight update information may include information regarding the number of receiver terminals, information for identifying each of the receiver terminals, and information regarding communication streams individually allocated to the receiver terminals. Therefore, the information for updating the weight to the second weight can be identified for each terminal.

Further, in the first aspect, the weight update information may include at least one of the first weight, a parameter for converting the first weight into the second weight, or the second weight. Therefore, information to be transmitted as the weight update information can be appropriately selected and transmitted.

Further, in the first aspect, the weight update information may further include mode information indicating which of the first weight, the parameter for converting the first weight into the second weight, and the second weight the weight update information includes. Therefore, it is possible to cause the another wireless base station to determine information included as the weight update information.

Further, in the first aspect, the parameter may include information regarding transmission power for the joint transmission. Therefore, it is possible to cause the another wireless base station to determine the transmission power in the joint transmission.

Further, in the first aspect, the parameter may include information regarding an eigenvector of a channel for a terminal serving as a receiver of the joint transmission using the first weight and not serving as a receiver of the joint transmission using the second weight. Therefore, it is possible to cause the another wireless base station to determine a transmission direction when the number of terminals is smaller in the joint transmission than in the previous joint transmission.

Further, in the first aspect, the parameter may include information regarding an eigenvector of a channel for a terminal serving as a receiver of the joint transmission using the second weight and not serving as a receiver of the joint transmission using the first weight. Therefore, it is possible to cause the another wireless base station to determine a transmission direction when the number of terminals is larger in the joint transmission than in the previous joint transmission.

Further, a second aspect of the present technology is a wireless base station including: a communication unit configured to receive weight update information from another wireless base station that has previously performed joint transmission using a first weight; and a wireless control unit configured to update the first weight to a second weight on the basis of the weight update information, the second weight being used for the joint transmission after the joint transmission using the first weight. Therefore, it is possible to receive the weight update information for updating the first weight to the second weight from the another wireless base station and update the first weight to the second weight.

Further, in the second aspect, the wireless control unit may generate capability information for determining whether or not the joint transmission can be performed in the wireless base station and regarding an algorithm usable for updating the first weight to the second weight, and the communication unit may notify the another wireless base station of the capability information. Therefore, the another wireless base station can be notified of the capability information before weight update is performed.

Further, in the second aspect, in a case where the weight update information includes target data for performing the joint transmission by using the second weight, the wireless control unit may extract the target data. Therefore, it is possible to simultaneously perform notification of the weight update information and sharing of the data.

Further, in the second aspect, in a case where the weight update information includes information indicating that the weight update information includes the target data, the wireless control unit may extract the target data. Therefore, the target data can be extracted in a case where the target data is included therein.

Further, in the second aspect, the weight update information may include information for updating the weight to the second weight for the another wireless base station and for each receiver terminal of the joint transmission and further include index information for identifying the another wireless base station and each receiver terminal. Therefore, the information for updating the weight to the second weight can be individually identified.

Further, in the second aspect, the index information may include information regarding the number of the other wireless base stations and information for identifying each of the other wireless base stations. Therefore, the information for updating the weight to the second weight can be identified for each wireless base station.

Further, in the second aspect, the weight update information may include information regarding the number of receiver terminals, information for identifying each of the receiver terminals, and information regarding communication streams individually allocated to the receiver terminals. Therefore, the information for updating the weight to the second weight can be identified for each terminal.

Further, in the second aspect, the weight update information may include at least one of the first weight, a parameter for converting the first weight into the second weight, or the second weight. Therefore, information to be transmitted as the weight update information can be appropriately selected and transmitted.

BRIEF DESCRIPTION OF DRAWINGS

FIG. 4 shows a configuration example of a frame issued in capability exchanges 811 and 812 according to an embodiment of the present technology.

MODE FOR CARRYING OUT THE INVENTION

Hereinafter, modes for carrying out the present technology (hereinafter, referred to as "embodiments") will be described. Description will be made in the following order.
1. Overall processing
2. Examples of weight update
<1. Overall Processing>
[Wireless Network System]

Figure 1:
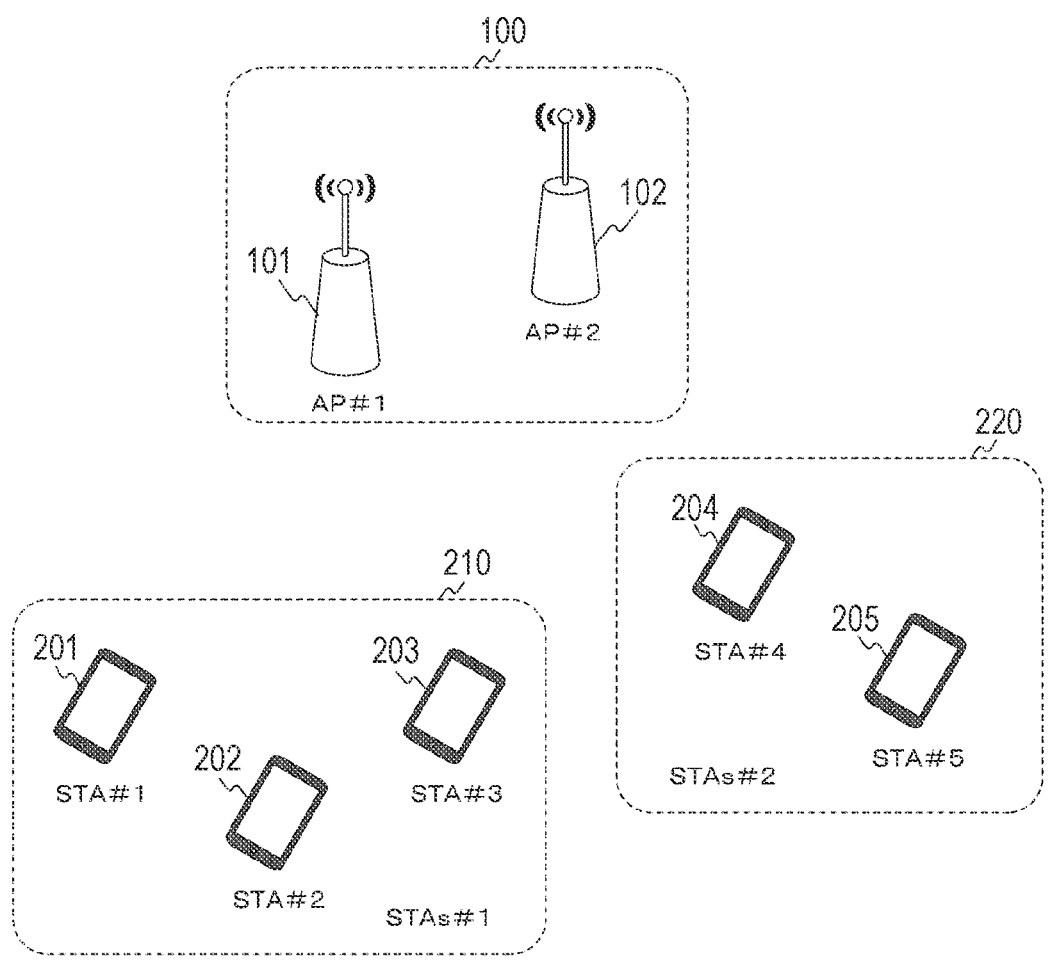
FIG. 1 illustrates a configuration example of a wireless network system according to an embodiment of the present technology.

FIG. 1 illustrates a configuration example of a wireless network system according to an embodiment of the present technology.

In the wireless network system, a plurality of access points AP #1 (101) and AP #2 (102) and a plurality of communication terminals STA #1 (201), STA #2 (202), STA #3 (203), STA #4 (204), and STA #5 (205) are connected to each other. Further, the access points AP #1 (101) and AP #2 (102) perform joint transmission on a plurality of arbitrary communication terminals as multi-APs 100.

For ease of description below, a communication terminal group with an arbitrary number of communication terminals among all the communication terminals STA will be referred to as STAs. In FIG. 1, the STA #1 to the STA #3 belong to STAs #1, and the STA #4 and the STA #5 belong to STAs #2, but the number of components of each communication terminal group and the number of communication terminal groups are not limited thereto. Further, the same communication terminal may redundantly belong to a plurality of communication terminal groups. Similarly, in FIG. 1, two APs, i.e., the AP #1 (101) and the AP #2 (102), are illustrated as APs included in the multi-APs 100, but three or more APs may be illustrated as the APs.

Among the APs included in the multi-APs 100, an AP that acquires a transmission right before joint transmission is performed will also be referred to as a sharing AP, and another AP that does not acquire the transmission right will also be referred to as a shared AP. The sharing AP and shared AP may play the following roles. That is, in a case where the sharing AP performs cooperative operation with the shared AP as the multi-APs, the sharing AP obtains the transmission right and then notifies the shared AP of performing the cooperative operation within a transmission time period acquired by the sharing AP itself. Note that the sharing AP will also be referred to as a master AP, and the shared AP will also be referred to as a slave AP. Further, the sharing AP and the shared AP are not fixedly determined for the APs and may be dynamically determined in the multi-APs. For example, an AP1 may be the sharing AP and an AP2 may be the shared AP at a certain time t1, and the AP1 may be the shared AP and the AP2 may be the sharing AP at a different time t2.

Further, in a case where the sharing AP and the shared AP perform joint transmission, the sharing AP and the shared AP share data and notify each other of a weight. However, the sharing AP may share data with the shared AP and notify the shared AP of a weight, and, similarly, the shared AP may share data with the sharing AP and notify the sharing AP and another shared AP of a weight.

Note that communication between the multi-APs and communication between the multi-APs and the communication terminals may use different frequency channels. For example, the multi-APs may perform communication in a 6 GHz band, and the multi-APs and the communication terminals may perform communication in a 2.4 GHz band and 5 GHz band. In this case, it is possible to prevent the communication between the multi-APs and the communication between the multi-APs and the communication terminals from interfering with each other. Further, the communication between the multi-APs may be performed by wired communication using an optical fiber, power line, or the like.

Further, the frequency channels used between the multi-APs and the communication terminal group in joint transmission may completely match or may only partially match. For example, when two frequency channels $B_1$ and $B_2$ are used between the AP #1 and the communication terminal group and two frequency channels $B_2$ and $B_3$ are used between the AP #2 and the communication terminal group, joint transmission may be performed only in the frequency channel $B_2$.

[Configuration of Apparatus]

Figure 2:
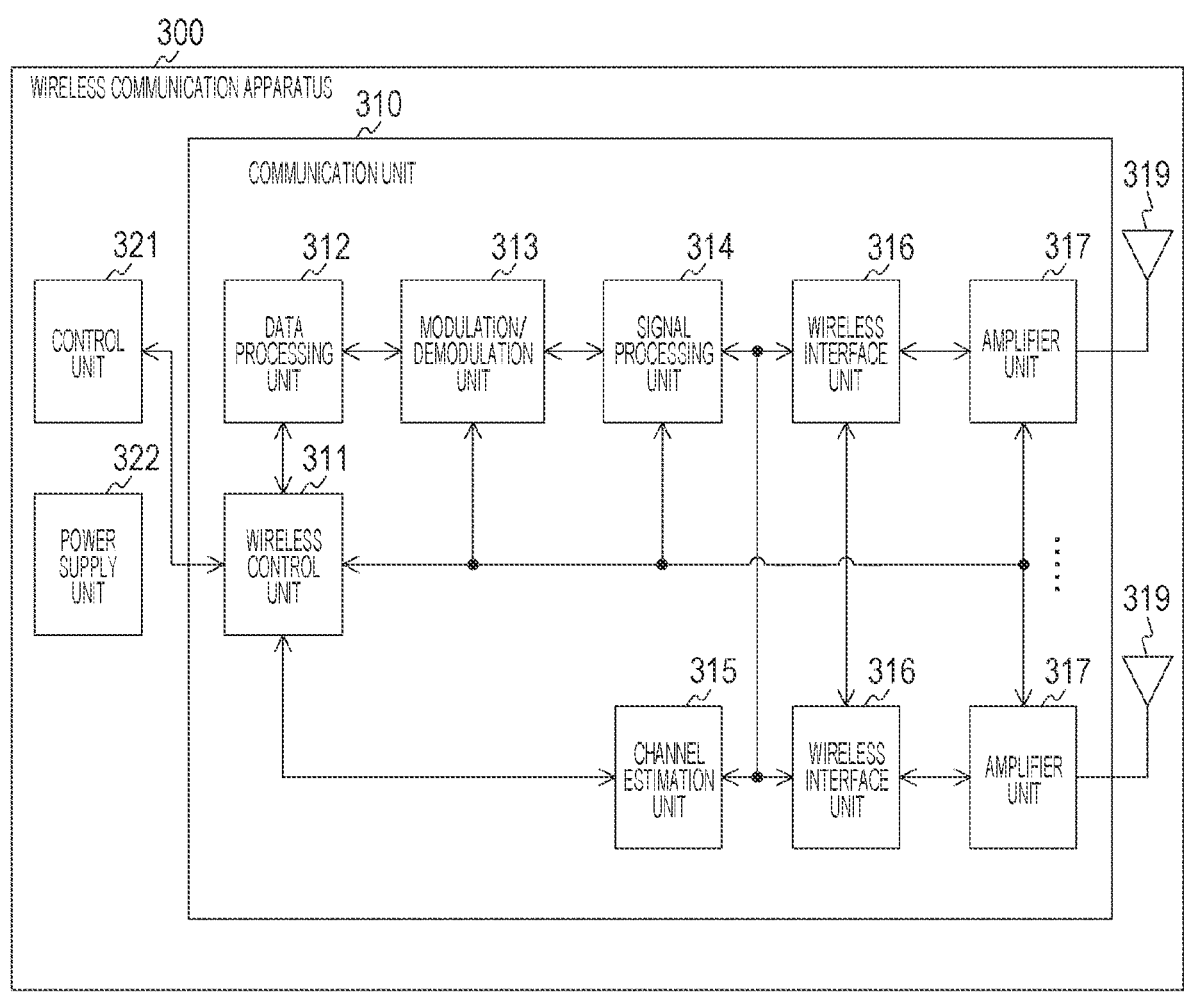
FIG. 2 illustrates a configuration example of a wireless communication apparatus 300 according to an embodiment of the present technology.

FIG. 2 illustrates a configuration example of a wireless communication apparatus 300 according to the embodiment of the present technology. The wireless communication apparatus 300 here includes the access points AP #1 (101) and AP #2 (102) described above and the communication terminals STA #1 (201) to STA #5 (205). For example, the wireless communication apparatus 300 may be a wireless communication module or integrated circuit mounted on the APs or terminals.

The wireless communication apparatus 300 includes a communication unit 310, a control unit 321, a power supply unit 322, and an antenna 319. There may be a plurality of communication units 310.

The communication unit 310 includes a wireless control unit 311, a data processing unit 312, a modulation/demodulation unit 313, a signal processing unit 314, a channel estimation unit 315, a wireless interface unit 316, and an amplifier unit 317. The wireless interface unit 316, the amplifier unit 317, and the antenna 319 may be regarded as one set, and one or more sets may be included therein as a component. Further, the wireless interface unit 316 may have a function of the amplifier unit 317. The communication unit 310 is implemented by, for example, a large scale integration (LSI).

At the time of transmission, i.e., when data is input from an upper layer, the data processing unit 312 generates a packet for wireless transmission on the basis of the data, performs processing of adding a header for media access control (MAC), processing of adding an error detection code, and the like, and provides the processed data for the modulation/demodulation unit 313. Meanwhile, at the time of reception, i.e., when the data processing unit receives input from the modulation/demodulation unit 313, the data processing unit performs analysis of a MAC header, detection of a packet error, reorder processing, and the like, and provides the processed data for a protocol upper layer thereof.

The wireless control unit 311 exchanges information between the units. Further, the wireless control unit 311 also performs parameter setting in the modulation/demodulation unit 313 and the signal processing unit 314, packet scheduling in the data processing unit 312, and parameter setting and transmission power control of the modulation/demodulation unit 313, the signal processing unit 314, the wireless interface unit 316, and the amplifier unit 317.

At the time of transmission, the modulation/demodulation unit 313 encodes, interleaves, and modulates data input from the data processing unit 312 on the basis of an encoding method and a modulation method set by the wireless control unit 311, generates a data symbol stream, and supplies the data symbol stream to the signal processing unit 314. At the time of reception, the modulation/demodulation unit performs reverse processing to the processing at the time of transmission on input from the signal processing unit 314 and supplies the data to the data processing unit 312 or the wireless control unit 311.

At the time of transmission, the signal processing unit 314 performs signal processing for spatial separation on input from the modulation/demodulation unit 313 as necessary and supplies the resultant one or more transmission symbol streams to each wireless interface unit 316. Note that the signal processing unit may perform transmission (hereinafter, cyclic shift delay (CSD)) by applying an arbitrary amount of delay for each antenna 319, instead of performing spatial separation. Further, at the time of reception, the signal processing unit 314 performs signal processing on received symbol streams input from the respective wireless interface units 316, performs spatial decomposition of the streams as necessary, and supplies the streams to the modulation/demodulation unit 313.

The channel estimation unit 315 calculates complex channel gain information of a channel on the basis of preamble sections and training signal sections of signals input from the respective wireless interface units 316. The calculated complex channel gain information is used for demodulation processing in the modulation/demodulation unit 313 and spatial processing in the signal processing unit 314 via the wireless control unit 311.

At the time of transmission, the wireless interface unit 316 converts input from the signal processing unit 314 into an analog signal, performs filtering, up-conversion to a carrier frequency, and phase control, and transmits the signal to the antenna 319 or the amplifier unit 317. At the time of reception, the wireless interface unit 316 performs reverse processing on input from the antenna 319 or the amplifier unit 317 and supplies data to the signal processing unit 314 and the channel estimation unit 315.

At the time of transmission, the amplifier unit 317 amplifies an analog signal input from the wireless interface unit 316 to predetermined power and transmits the signal to the antenna 319. At the time of reception, the amplifier unit amplifies a signal input from the antenna 319 to predetermined power and outputs the signal to the wireless interface unit 316. The wireless interface unit 316 may have all or part of at least one of the functions at the time of transmission and reception of the amplifier unit 317. Further, all or part of at least one of the functions at the time of transmission and reception of the amplifier unit 317 may be a component outside the communication unit 310.

The control unit 321 controls the wireless control unit 311 and the power supply unit 322. Further, the control unit 321 may perform at least part of operation of the wireless control unit 311, instead of the wireless control unit 311.

The power supply unit 322 includes a battery power supply or fixed power supply and supplies power to each unit of the wireless communication apparatus 300.

Further, a plurality of communication units 310 may be mounted and may be connected to a single control unit. At this time, at least one of the plurality of communication units 310 may be used for communication only with another AP. For example, in a case where the APs perform communication, the at least one communication unit may be used as a dedicated communication interface for backhaul and be operated in a frequency channel different from that for communication with the communication terminals.

Among those configurations, the wireless control unit 311 and the control unit 321 control each unit to perform the following operation.

[Operation]

Figure 3:
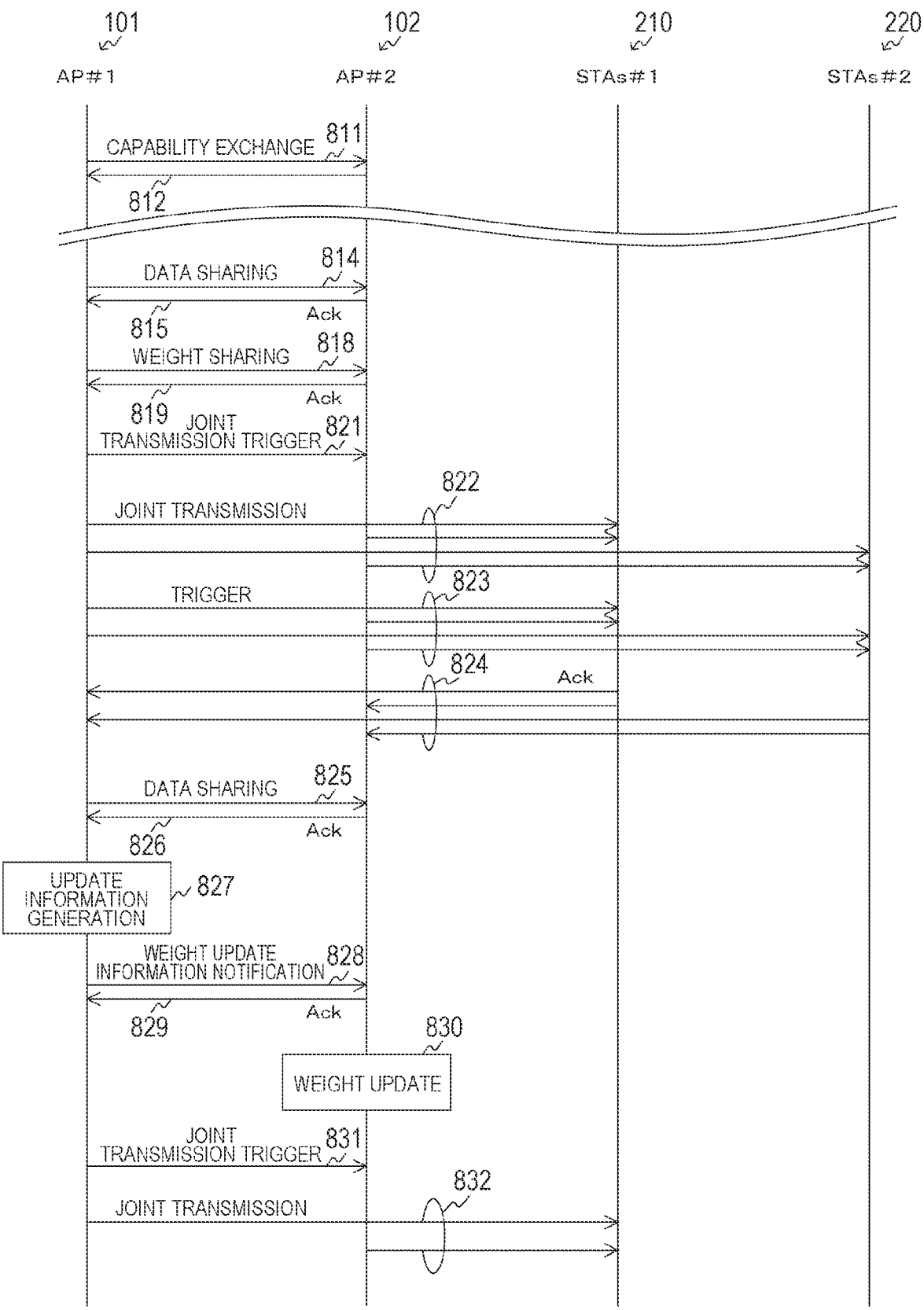
FIG. 3 is a sequence diagram showing an operation example of a wireless network system according to an embodiment of the present technology.

FIG. 3 is a sequence diagram showing an operation example of a wireless network system according to the embodiment of the present technology.

Here, the two AP #1 and AP #2 exist as the APs included in the multi-APs, and the plurality of communication terminal groups STAs #1 and #2 exists. FIG. 3 shows a case where a capability exchange 811 is first performed in the AP #1, but the capability exchange may be performed first in the AP #2. Further, similarly, FIG. 3 shows a case where a trigger 823, data sharing 814, weight update information 828, and joint transmission trigger 821 are performed in the AP #1, but some or all thereof may be performed in the AP #2.

For example, the data sharing 814 is performed from the AP #2 to the AP #1, whereas the weight update information 828 may be performed from the AP #1 to the AP #2. Further, update information generation 827 is performed in the AP #1, and weight update 830 is performed in the AP #2, but the update information generation 827 may be performed in the AP #2, and the weight update 830 may be performed in the AP #1.

Further, in FIG. 3, joint transmission is performed twice, and first joint transmission is performed on the STAs #1 and the STAs #2, and next joint transmission is performed only on the STAs #1. However, this order may be reversed, and receivers may not be as shown in FIG. 3. That is, the first joint transmission may be performed only on the STAs #2, and the next joint transmission may be performed on the STAs #1 and the STAs #2, or both the first joint transmission and the next transmission may be performed only on the STAs #1 or on both the STAs #1 and the STAs #2.

Further, part of the sequences may be collectively performed as a single sequence as necessary, or part of the sequences may be omitted. For example, the trigger 823 may not exist, and the weight update information 828 may be performed simultaneously with the data sharing 825. Further, for example, the capability exchange 811 may be performed simultaneously with the weight update information 828.

Further, in a case where the joint transmission is performed, sounding may be performed in advance. This is because, in order to calculate a weight for performing CJT, the AP #1 and the AP #2 included in the multi-APs need to acquire channel state information with the communication terminal group in a case where the AP #1 and the AP #2 form a single virtual AP. Therefore, in the sounding, reference signals of known sequences are transmitted from the respective antennas of the multi-APs, and, at this time, sequences orthogonal between the antennas are used.

Further, immediately before the sounding, information regarding the sounding may be issued between the multi-APs. This is because the multi-APs are required to perform adjustment of a transmission timing and frequency synchronization in the joint transmission, and thus, similarly, the multi-APs are also required to perform adjustment of a transmission timing and frequency synchronization in the sounding for acquiring feedback for calculating the weight in the joint transmission. Therefore, immediately before the sounding, the multi-APs are required to perform notification of a time at which the sounding is started, notification of a parameter for orthogonalizing reference signals transmitted between the antennas, and transmission of a signal for performing frequency synchronization. Immediately before the sounding, a frame for simultaneously performing the above notification and transmission may be transmitted between the multi-APs.

In a case where the above notification of information regarding the sounding and the sounding are performed, the notification and the sounding may be performed immediately before weight sharing 818. Each communication terminal that has received the reference signal by the sounding estimates a channel with the multi-APs on the basis of the reference signals and notifies the multi-APs of information regarding the channel. The information regarding the channel here may be a complex matrix directly indicating the channel or may be information regarding an eigenvector for a channel matrix as indicated in compressed feedback of "IEEE 802.11-2016".

Note that Ack in FIG. 3 represents notification of information indicating a reception result of notification of information performed immediately before. A notification method here may be performed by Ack or block Ack defined in "IEEE 802.11-2016".

[Capability Exchange]

First, the AP #1 and the AP #2 notify each other of information regarding their own capabilities. This is referred to as the capability exchanges 811 and 812. The capabilities here include whether or not joint transmission 822 and joint transmission 832 can be performed, whether or not the weight update 830 can be performed, and the type of algorithm used in a case where the weight update 830 is performed, but are not limited thereto.

The algorithm for the weight update may be or may not be implemented depending on the APs. Therefore, among generally known algorithms such as zero forcing (ZF) and minimize maximum square error (MMSE), an algorithm implemented therein may be issued in the capability exchanges 811 and 812. Further, instead of the generally known algorithms described above, an algorithm independently implemented by a vendor may be issued.

The capability exchanges 811 and 812 may be performed by being included in, for example, a beacon signal that is periodically transmitted by each AP or an information notification (association) for connecting the APs to operate the APs as the multi-APs.

FIG. 4 shows a configuration example of a frame issued in the capability exchanges 811 and 812 according to the embodiment of the present technology.

A notification frame in the capability exchanges 811 and 812 includes "frame control", "receiver address", "transmitter address", and "extremely high throughput (EHT) capabilities", but is not limited to.

The "frame control" includes information indicating that the frame is issued in the capability exchanges 811 and 812.

The "receiver address" (RA) includes information indicating a receiver terminal of the frame. For example, the receiver address may include information indicating a media access control (MAC) address of the receiver terminal. In a case where a plurality of specific terminals or all terminals that can receive the frame are set as the receiver terminals, the receiver address may include information indicating that the frame may be received by those terminals. The "transmitter address" (TA) includes information indicating a transmitter terminal of the frame. The transmitter address, similarly to the "receiver address", may include information indicating a MAC address of the transmitter.

The "EHT capabilities" element includes information indicating a capability of the wireless communication apparatus that transmits the frame and particularly includes information indicating whether or not simultaneous transmission can be performed, information regarding whether or not the weight update 830 described later can be performed, and information regarding an algorithm that can be performed.

The "EHT capabilities" element includes at least one of fields of "element ID", "length", "joint transmission", and "weight update".

The "element ID" includes information indicating that the element is the "EHT capabilities". The "length" includes information indicating a bit length of information stored as the "EHT capabilities". The "joint transmission" includes information regarding whether or not joint transmission can be performed in the terminal that issues the frame.

The "weight update" includes the information regarding whether or not the weight update 830 can be performed in the terminal that issues the frame and the information regarding an algorithm that can be performed therein. For example, the "weight update" may include information indicating whether or not the "Gram-Schmidt orthogonalization process" is used.

As a specific example, in a case where the "joint transmission" is a 2-bit length, information may be indicated as follows. For example, in a case where the "joint transmission" is "00", the "joint transmission" may indicate that neither non coherent joint transmission (NCJT) nor the CJT can be performed in the joint transmission. Further, in a case where the "joint transmission" is "01", the "joint transmission" may indicate that the NCJT can be performed but the CJT cannot be performed in the joint transmission. Further, in a case where the "joint transmission" is "10", the "joint transmission" may indicate that both the NCJT and the CJT can be performed in the joint transmission. Further, the "joint transmission" may include not only the above 2-bit information, but also information indicating maximum transmission power that can be allocated to the CJT by the AP that transmits the frame.

[Data Sharing and Weight Sharing]

In a case where the CJT is performed in the joint transmission, the sharing 814 of data transmitted in the CJT and the sharing 818 of the weight applied in the CJT are performed in advance between the multi-APs. FIG. 3 shows an example where the AP #1 performs the data sharing 814 and the weight sharing 818 with respect to the AP #2 as the sharing AP, but the AP #2 may perform the data sharing 814 and the weight sharing 818 as the sharing AP.

Meanwhile, as in NCJT, in a case where the data sharing and notification of the weight are not necessary between the multi-APs, the data sharing 814 and the weight sharing 818 may not be performed.

[Joint Transmission Trigger]

The multi-APs, which have notified each other that joint transmission can be performed through the capability exchanges 811 and 812, perform a joint transmission trigger (JT trigger) 821 that is an information notification for inducing joint transmission immediately before performing the joint transmission 822. However, before the joint transmission 822 is performed, the multi-APs and the communication terminals need to be subjected to sounding and also need to hold weights for performing the joint transmission. Further, in a case where the CJT is performed in the joint transmission, data to be transmitted in the CJT needs to be shared between the multi-APs in advance.

In the joint transmission trigger 821, a frame issued as the joint transmission trigger 821 includes information indicating that the frame is issued as the joint transmission trigger 821. Further, the joint transmission trigger may include information indicating a time period in which the joint transmission is performed, but does not necessarily need to include the information. For example, the joint transmission trigger does not necessarily need to include the information in a case where the multi-APs implicitly agree that the joint transmission 822 is performed when a predetermined time elapses after the joint transmission trigger 821 is received.

Note that, here, the joint transmission trigger 821 before the joint transmission 822 is performed has been described, but the same applies to a joint transmission trigger 831 before the joint transmission 832 is performed.

[Joint Transmission]

The AP that has received the joint transmission trigger 821 and the AP that has transmitted the joint transmission trigger 821 perform the joint transmission 822.

Note that the same applies to the joint transmission 832, but the number of receiver terminals may be different from that in the joint transmission 822.

[Trigger]

After the joint transmission 822 is performed, the communication terminals serving as receivers in the joint transmission 822 return Ack 824 to the multi-APs. Further, among the communication terminals that perform the Ack 824, a communication terminal that has acquired a transmission right may perform the Ack 824 first, but the Ack 824 may be performed by frequency multiplexing such as orthogonal frequency division multiple access (OFDMA) defined in IEEE 802.11. In this case, immediately before the Ack 824 is performed by the OFDMA, the trigger 823 needs to be performed as an information notification for issuing a transmission time, transmission power, and a frequency to be allocated to each communication terminal.

[Weight Update]

In a case where the multi-APs that have performed the joint transmission 822 once perform the joint transmission 832 again and a communication terminal serving as a receiver is changed, the sharing AP performs the update information generation 827 for changing a weight of the CJT, power to be allocated to a transmission stream, an identification number of the stream, and an encoding method (modulation and coding scheme: MCS) in accordance with the change of the communication terminal.

Further, the sharing AP notifies the shared AP of the changed weight, the power to be allocated to the stream, the identification number of the stream, and weight update information (weight update info) 828 regarding the MCS.

Figure 5:
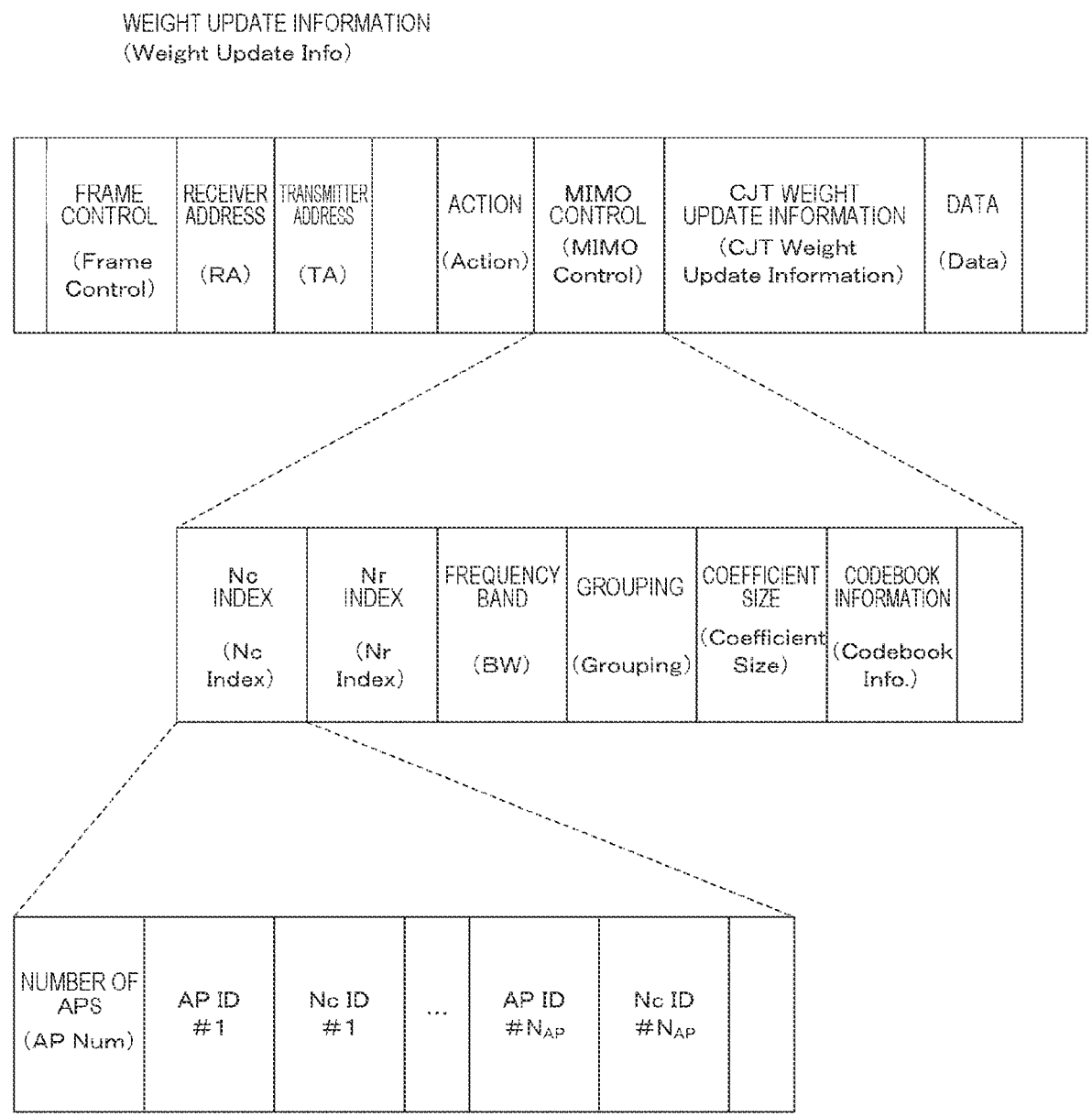
FIG. 5 shows a configuration example of a frame issued as weight update information 828 according to an embodiment of the present technology.

FIG. 5 shows a configuration example of a frame issued as the weight update information 828 according to the embodiment of the present technology.

A notification frame in the update information notification 828 includes "frame control", "receiver address", "transmitter address", "action", "MIMO control", "CJT weight update information", and "data", but components thereof are not limited thereto.

The "frame control", "receiver address", and "transmitter address" are similar to those in the above-described capability exchanges 811 and 812. However, in a case where the receiver is a plurality of shared APs, the "receiver address" may include information indicating those APs.

The "action" includes information indicating whether or not the frame includes the subsequent "CJT weight update information" and "data". The "MIMO control" includes information for deciphering the information included in the subsequent "CJT weight update information". The "CJT weight update information" includes information regarding a weight to be applied in the immediately subsequent CJT. The data" includes data to be transmitted in the CJT.

As a specific example of the information included in the "action", for example, the information may include the following information when the action is indicated by a 2-bit length. That is, "00" indicates that the frame includes both the "CJT weight update information" and the "data". Further, "01" indicates that the frame does not include the "CJT weight update information" but includes the "data". Furthermore, "01" indicates that the frame includes the "CJT weight update information" but does not include the "data". Still further, "11" indicates that the frame includes neither the "CJT weight update information" nor the "data".

The "MIMO control" includes at least one of the following subfields: "Nc index", "Nr index", "frequency band", "grouping", "coefficient size", and "codebook information".

The "Nc index" and the "Nr index" include information regarding the AP and receiver communication terminal to which a CJT weight indicated in the "CJT weight update information" is applied. That is, the "Nc index" includes "the number of APs (AP Num)", an "AP identifier (AP ID)", and a "terminal identifier (Nc ID)". The same applies to the "Nr index". The "frequency band (BW)" and the "grouping" include information indicating a frequency to which the weight included in the "CJT weight update information" is applied. The "coefficient size (coefficient)" and the "codebook information" include information regarding resolution of the weight included in the "CJT weight update information".

For example, in a case where the "CJT weight update information" includes information indicating a matrix W representing the CJT weight, the "Nc index" may include information indicating to which column a weight of each AP to which the CJT weight is applied corresponds with respect to WT that is a transposed matrix of W, and the "Nr index" may include information indicating to which row a weight to each communication terminal serving as a receiver in the CJT corresponds.

Further, in a case where a transmission method is an orthogonal frequency domain multiplexing (OFDM) modulation method and the matrix W is transmitted only to some subcarriers among subcarriers used in the OFDM, the "frequency band" may include information indicating a frequency band to which the CJT weight is applied, and the "grouping" may include information indicating which subcarrier's weight is included in the "CJT weight update information" among frequency bands indicated by the "frequency band". That is, the weight update information can be transmitted for all frequencies, but the weight update information to be transmitted may be reduced between adjacent frequencies, and, for example, the weight update information may be transmitted every four frequencies, and the "grouping" indicates a correspondence of the weight update information in a case where such reduction is performed.

Further, in a case where the matrix W has an eigenvector indicated by a parameter derived from an operation such as a Givens rotation with respect to a matrix H representing the channel state information, the "codebook information" may include information indicating how many bits each parameter is represented by.

Similarly, in a case where the matrix W is directly represented as a matrix of complex numbers, the "coefficient size" may include information indicating how many bits a complex number serving as each element of the matrix is represented by.

<2. Examples of Weight Update>

Hereinafter, parameter calculation in the update information generation 827 and a weight calculation method in the weight update 830 will be described, and examples of details of information included in the "CJT weight update information" will also be described.

First Example

In a first example, the two AP #1 (101) and AP #2 (102) are included in the multi-APs 100, and three communication terminals STA #1 to STA #3 are connected to the multi-APs 100. Then, there will be described a case where the STA #1 to the STA #3 serve as receivers in $L_1$st joint transmission and the STA #1 and the STA #2 serve as receivers in $L_2$nd joint transmission. Here, $1 \leq L_1 < L_2$ is established. That is, the first example shows an example where the number of terminals serving as the receivers in the $L_2$nd joint transmission is smaller than the number of terminals serving as the receivers in the $L_1$st joint transmission.

First, for the sake of generalization, a weight performed in the CJT (hereinafter, CJT weight) at a k-th frequency in an l-th time is expressed by Expression 1.

[Math. 1]

$$W^{(k,l)} = \begin{bmatrix} w_{1,1}^{(k,l)} & \cdots & w_{1,N_{AP}}^{(k,l)} \\ \vdots & \ddots & \vdots \\ w_{N_{STA},1}^{(k,l)} & \cdots & w_{N_{STA},N_{AP}}^{(k,l)} \end{bmatrix} \quad \text{EXPRESSION 1}$$

Here, a matrix $w_{ij}^{(k,l)}$, which is a $W^{(k,l)}$ element, represents a weight that a j-th AP applies to an i-th communication terminal in the l-th CJT at the k-th frequency. Further, for an arbitrary c, in $w_{(N_{STA}, c)}^{(k,l)}$, $N_{STA}$ represents the number of communication terminals serving as receivers in the l-th CJT at the k-th frequency, and, similarly, NAP represents the number of APs that perform the l-th CJT at the k-th frequency.

At this time, the $L_1$st and $L_2$nd CJT weights $W^{(k, L1)}$ and $W^{(k, L2)}$ at the k-th frequency are expressed by Expressions 2 and 3 below, respectively.

[Math. 2]

$$W^{(k,L_1)} = \begin{bmatrix} w_{1,1}^{(k,L_1)} & \cdots & w_{1,N_{AP}}^{(k,L_1)} \\ \vdots & \ddots & \vdots \\ w_{N_{STA},1}^{(k,L_2)} & \cdots & w_{N_{STA},N_{AP}}^{(k,L_1)} \end{bmatrix} \quad \text{EXPRESSION 2}$$

[Math. 3]

$$W^{(k,L_2)} = \begin{bmatrix} w_{1,1}^{(k,L_2)} & \cdots & w_{1,N_{AP}}^{(k,L_1)} \\ \vdots & \ddots & \vdots \\ w_{N_{STA},1}^{(k,L_2)} & \cdots & w_{N_{STA},N_{AP}}^{(k,L_2)} \end{bmatrix} \quad \text{EXPRESSION 3}$$

At this time, as compared with the $L_1$st CJT, the transmission power allocated to the STA #3 can be used for the transmission to the STA #1 and the STA #2 in the $L_2$nd CJT weight $W^{(k, L2)}$ at the k-th frequency, and thus, a weight obtained by changing only the transmission power in each stream from $W^{(k, L1)}$ can be used as the weight for the STA

1 and STA #2. At this time, in arbitrary i and j, $w_{ij}^{(k, L1)}$ and $w_{ij}^{(k, L2)}$ satisfy a relationship in Expression 4 below.

[Math. 4]

$$w_{ij}^{(k,L_2)} = \begin{cases} \text{diag}\left[\sqrt{\gamma_j^{(k,i,L_1,L_2)}}, \ldots, \sqrt{\gamma_{n(j)}^{(k,i,L_1,L_2)}}\right] w_{ij}^{(k,L_1)} & i = 1, \ldots, N_{STA}^{(L_2)} \\ 0 & \text{otherwise} \end{cases}$$ EXPRESSION 4

Here, n(i) represents the number of columns of $w_{ij}^{(k, L1)}$. Further, a real number $\gamma_m^{(k, i, L1, L2)}$ represents a power ratio of a CJT weight in an m-th stream of $W_{ij}^{(k, L1)}$ to a CJT weight in the m-th stream of $w_{ij}^{(k, L2)}$. Further, $N_{STA}^{(L2)}$ represents the number of communication terminals serving as receivers in the L$_2$nd CJT at the k-th frequency.

In the update information generation 827, $W^{(k, L2)}$ is obtained by determining $\gamma_1^{(k, i, L1, L2)}, \ldots, \gamma_{n(i)}^{(k, i, L1, L2)}$ as in Expression 4.

Here, $\gamma_1^{(k, i, L1, L2)}, \ldots, \gamma_{n(i)}^{(k, i, L1, L2)}$ may be determined such that the transmission power of any one of the AP #1 and the AP #2 has a maximum value equal to or less than a threshold. At this time, $\gamma_1^{(k, i, L1, L2)}, \ldots, \gamma_{n(i)}^{(k, i, L1, L2)}$ may be determined on the basis of the information issued in the capability exchanges 811 and 812 or, for example, may be determined to be equal to or less than a maximum transmission power that the AP #1 and the AP #2 can allocate in the CJT.

Figure 6:
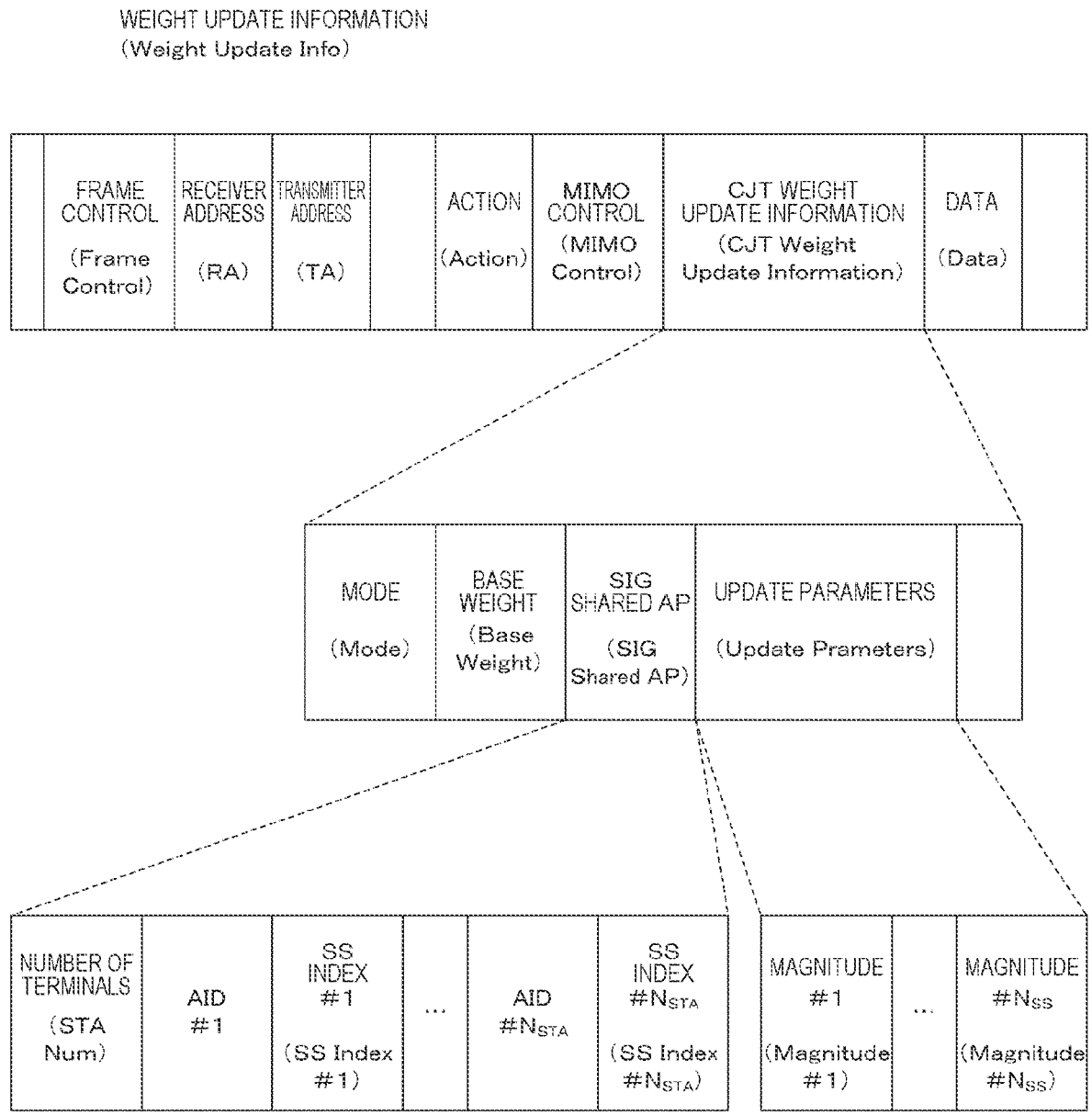
FIG. 6 shows a configuration example of a frame issued as weight update information performed immediately before $L_2$nd joint transmission according to a first example of an embodiment of the present technology.

FIG. 6 shows a configuration example of a frame issued as the weight update information performed immediately before the L$_2$nd joint transmission according to the first example in the embodiment of the present technology.

A notification frame in the update information notification includes "frame control", "receiver address", "transmitter address", "action", "MIMO control", "CJT weight update information", and "data", but components thereof are not limited thereto. Further, the "data" may not exist, and the "frame control", "receiver address", "transmitter address", "action", and "MIMO control" are similar to those described above.

The "CJT weight update information" includes fields of "mode", "base weight", "SIG shared AP", and "update parameters". The "mode" includes information for identifying information included in the subsequent fields. The "base weight" includes information indicating the number of times $L_1$ of joint transmission. The "SIG shared AP" includes information regarding the communication terminals serving as the receivers in the L$_2$nd CJT. The "update parameters" includes information regarding a "magnitude". The subfield "magnitude" includes information regarding $\gamma_1^{(k, i, L1, L2)}, \ldots, \gamma_{n(1)}^{(k, i, L1, L2)}$ in Expression 4. That is, the "magnitude" includes information regarding the transmission power.

As a specific example of the information included in the "mode", when the "mode" has a 2-bit length, the information may include "01" indicating that the frame corresponds to the frame in the first example.

Further, the "SIG shared AP" may include one or more subfields of "number of terminals", "AIDs", and "SS indices". The "number of terminals (STA Num)" includes information indicating $N_{STA}$ that is the number of communication terminals serving as the receivers in the L$_2$nd CJT. The "AIDs (AID #1 to AID #$N_{STA}$)" include information for identifying each communication terminal serving as the receiver in the CJT. The "SS indices (SS Index #1 to SS Index #$N_{STA}$)" includes information indicating the number of streams to be transmitted to the communication terminals indicated by the respective AIDs in the L$_2$nd CJT.

Note that the "SIG shared AP" and the "update parameter" do not necessarily need to exist. For example, in a case where the CJT weights used for the STA #1 and the STA #2 used in the L$_2$nd time are equal to the CJT weights used in the L$_1$st time, only the "mode" and the "base weight" may exist. At this time, when the "mode" has a 2-bit length, the information included in the "mode" may include "00" indicating that there is no change.

For an arbitrary number p, a "magnitude #p" of the "update parameter" may include information indicating the following.

[Math. 5]

$$\frac{1}{N_{f_r} - N_{f_{r-1}}} \sum_{q=1+N_{f_{r-1}}}^{N_{f_r}} \gamma_m^{(q,i,L_1,L_2)} \quad r = 1, 2, \ldots, N_t$$ EXPRESSION 5

Here, $N_{f_r}$ represents an arbitrary number of subcarriers. Further, $N_r$ may be determined on the basis of values indicated by the "frequency band" and "grouping" in the "MIMO control". For example, in a case where the number of subcarriers used in the OFDM modulation method is NF and a natural number $N_g$ is indicated in the "grouping" in a frequency band indicated by the "frequency band", $N_{f_r}$ may be determined by Expression 6 below.

[Math. 6]

$$N_{f_s} = \min\left((r-1)\left\lceil\frac{N_F}{N_g}\right\rceil, N_F\right)$$ EXPRESSION 6

Here, min(a, b) represents a minimum number with respect to arbitrary real numbers a and b. Further, a portion of "NF/Ng" represents a ceiling function with respect to the real numbers.

Further, p, i, and m may satisfy a relationship in Expression 7 below.

[Math. 7]

$$p = m + \sum_{s=1}^{i-1} n(s)$$ EXPRESSION 7

At this time, in particular, $N_{SS}$ and $N_{STA}$ satisfy a relationship in Expression 8 below, and p may be a bijection for arbitrary (m, s).

[Math. 8]

$$N_{ss} = \sum_{r=1}^{N_{STA}} n(s)$$ EXPRESSION 8

In the weight update 830, the shared AP notified of the weight update information 828 may calculate a CJT weight of the shared AP itself in the L$_2$nd time by using Expressions 9 and 10 below. Here, the "magnitude" includes the information expressed by Expression 5. Further, $N_{f_r}$ in Expression 9 may satisfy Expression 6. Note that the weight in this case is calculated in the shared AP, and a tilde symbol is added to distinguish the weight from the weight calculated in the sharing AP described above. Here, diag[x] represents a diagonal matrix having each element of a vector x as a diagonal component.

[Math. 9]

$$\tilde{w}_{ij}^{(k,L_2)} = \begin{cases} \text{diag}\left[\sqrt{\frac{1}{N_{f_r}-N_{f_{r-1}}}\sum_{q=1+N_{f_{r-1}}}^{N_{f_r}}\gamma_m^{(q,i,L_1,L_2)}}, \ldots, \sqrt{\frac{1}{N_{f_r}-N_{f_{r-1}}}\sum_{q=1+N_{f_{r-1}}}^{N_{f_r}}\gamma_m^{(q,i,L_1,L_2)}}\right]\tilde{w}_{ij}^{(k,L_1)} & \text{if } f=1,\ldots,N_{STA}^{(L_2)} \\ 0 & \text{otherwise} \end{cases}$$

EXPRESSION 9

[Math. 10]

$$N_{f_{r-1}} < k \le N_{f_r}$$

EXPRESSION 10

Second Example

In a second example, similarly to the first example described above, the two AP #1 (101) and AP #2 (102) are included in the multi-APs 100, and the three communication terminals STA #1 to STA #3 are connected to the multi-APs 100. Then, there will be described a case where the STA #1 and the STA #2 serve as receivers in the $L_1$st joint transmission and the $L_2$nd joint transmission. Here, $1 \le L_1 < L_2$ is established. However, unlike the first example described above, in the second example, $W^{(k, L1)}$ and $W^{(k, L2)}$ do not satisfy the relational expression in Expression 4.

In the first example described above, transmission to the STA #3 serving as a receiver in the $L_1$st time is not performed in the $L_2$nd CJT, and thus the power allocated in the $L_1$st time is effectively used. However, in the "CJT DL MU MIMO", because the transmission to the STA #3 is not performed, the degree of freedom of a space usable for transmission to the STA #1 and the STA #2 increases, as compared with the $L_1$st transmission.

Therefore, the second example presents effectively using not only power but also the degree of freedom of the space.

Here, using the Gram-Schmidt orthogonalization process allows $W^{(k, L1)}$ and $W^{(k, L2)}$ to have a relationship in Expression 11.

[Math. 11]

$$w_i^{(k,L_1)} = \text{diag}\left[\sqrt{\gamma_1^{(k,i,L_1,L_2)}}, \ldots, \sqrt{\gamma_{N(i)}^{(k,i,L_1,L_2)}}\right]^{-1}$$

EXPRESSION 11

$$\left\{w_i^{(k,L_2)} - U_-^{(k)}\left(U_-^{(k)B} w_i^{(k,L_2)}\right)\right\}$$

s.t. $\left\{w_{i,j}^{(k,L_1)}\right\} = w_i^{(k,L_1)}$ $i=1,\ldots,N_{AP}, j \in N_{STA}(L_2 \cap L_1)$ Here, assuming that column numbers of CJT vectors used for the STA #1 and STA #2 in $W^{(k, L1)}$ and $W^{(k, L2)}$ are the same for the STA #1 and STA #2 that are communication terminals serving as receiver terminals common to the $L_1$st CJT and the $L_2$nd CJT, $N_{STA}(L_2 \cap L_1)$ represents a set of column numbers of the CJT vectors used for the STA #1 and STA #2.

Further, N(i) represents the number of columns of $w_i^{(k, L2)}$. Further, the real number $\gamma_m^{(k, i, L1, L2)}$ represents a power ratio of the CJT weight in the m-th stream of $w_i^{(k, L1)}$ to the CJT weight in the m-th stream of $w_i^{(k, L2)}$.

Further, a matrix $U_-^{(k)}$ represents a matrix (kernel vector) having, as a column vector, an eigenvector whose eigenvalue is not 0 with respect to channel matrices of the multi-APs and STA #3 in a vector space that is a kernel space with respect to channel matrices of the multi-APs, STA #1, and STA #2 at the k-th frequency.

The matrix $U_-^{(k)}$ can be calculated on the basis of feedback of the channel state information from the communication terminals. For example, explicit feedback beamforming in "IEEE 802.11-2016" defines channel state information (CSI) feedback that returns a channel matrix as a complex number and compressed feedback that returns an eigenvector of a channel matrix, and $U_-^{(k)}$ can be obtained by an arithmetic method described in "Mirette Sadek, et al., "A Leakage-Based Precoding Scheme for Downlink Multi-User MIMO Channels," IEEE Transactions on Wireless Communications, Vol. 6, No. 5, pp. 1711-1721 May 2007" for both the CSI feedback and the compression feedback.

At this time, when Expression 11 is transformed, an update expression for deriving $W(k, L_2)$ from $W(k, L_1)$ can be obtained as shown in Expression 12.

[Math. 12]

$$w_i^{(k,L_2)} = \left(I - U_-^{(k)} U_-^{(k)H}\right)^{-1}$$

EXPRESSION 12

$$\text{diag}\left[\sqrt{\gamma_1^{(k,i,L_1,L_2)}}, \ldots, \sqrt{\gamma_{n(i)}^{(k,i,L_1,L_2)}}\right] w_i^{(k,L_1)}$$

Note that I represents an identity matrix (eigen matrix).

$U_-^{(k)}$ is determined on the basis of the feedback of the channel state information from the communication terminals. Further, square roots of $\gamma_1^{(k, i, L1, L2)}, \ldots, \gamma_{n(i)}^{(k, i, L1, L2)}$ are determined by the sharing AP. Therefore, $W^{(k, L2)}$ can be obtained by Expression 12 in the update information generation 827.

Figure 7:
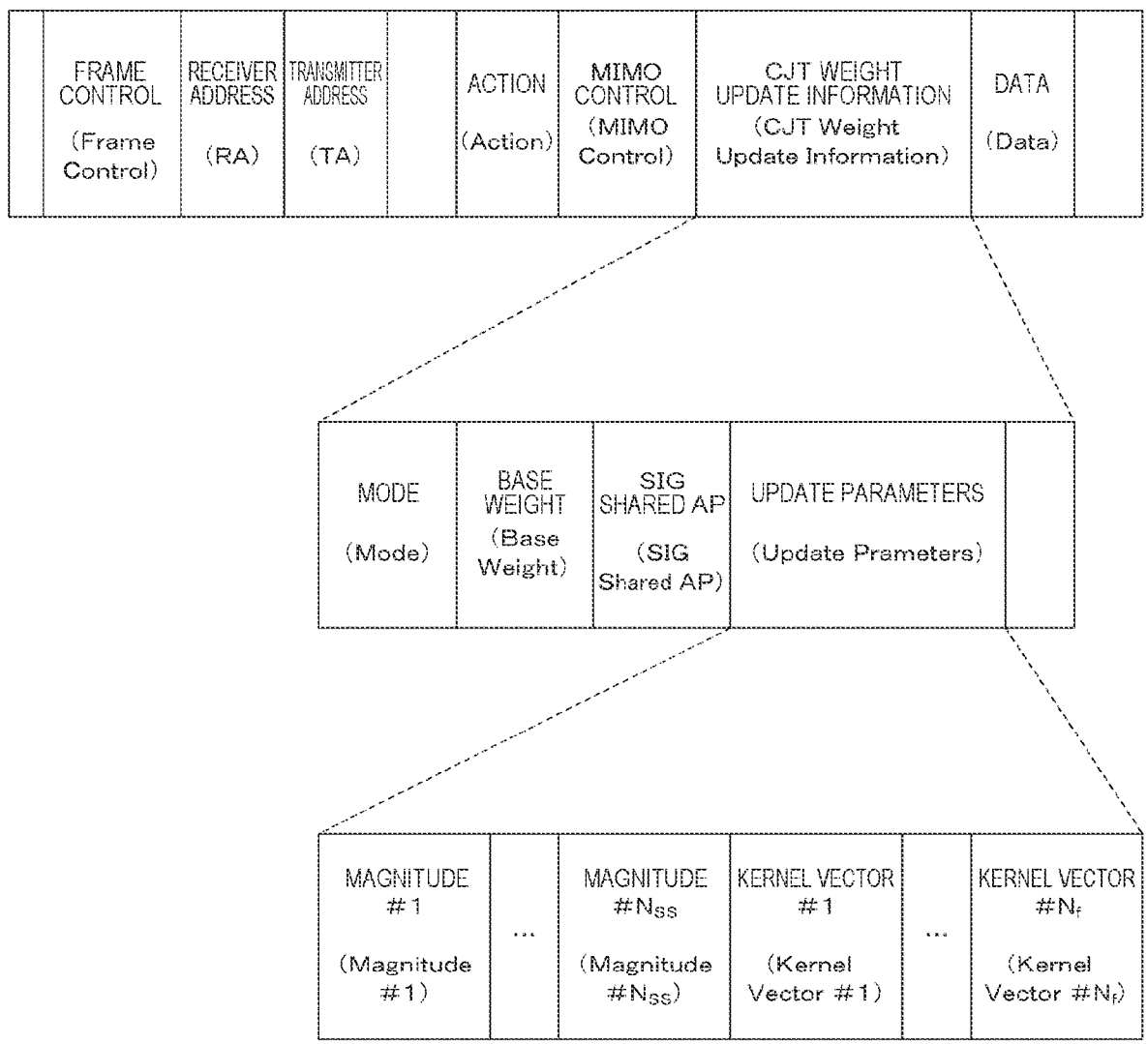
FIG. 7 shows a configuration example of a frame issued as weight update information performed immediately before $L_2$nd joint transmission according to second and third examples of an embodiment of the present technology.

FIG. 7 shows a configuration example of a frame issued as the weight update information performed immediately before the $L_2$nd joint transmission according to the second example in the embodiment of the present technology.

A notification frame in the update information notification includes "frame control", "receiver address", "transmitter address", "action", "MIMO control", "CJT weight update information", and "data", but components thereof are not limited thereto. Further, the "data" may not exist, and the "frame control", "receiver address", "transmitter address", "action", and "MIMO control" are similar to those described above.

The "CJT weight update information" includes fields of "mode", "base weight", "SIG shared AP", and "update parameters". The "mode" includes information for identifying information included in the subsequent fields. The "base weight" includes information indicating the number of times $L_1$ of joint transmission. The "SIG shared AP" includes information regarding the communication terminals serving as the receiver in the L$_2$nd CJT.

The "update parameter" includes information regarding a "kernel vector" in addition to the "magnitude".

As a specific example of the information included in the "mode", when the "mode" has a 2-bit length, the information may include "10" indicating that the frame corresponds to the frame in the second example.

Further, although not shown in FIG. 7, the "SIG shared AP" may include one or more subfields of "number of terminals", "AIDs", and "SS indices", similarly to the first example. The "number of terminals (STA Num)" includes information indicating $N_{STA}$ that is the number of communication terminals serving as the receivers in the L$_2$nd CJT. The "AIDs (AID #1 to AID #$N_{STA}$)" include information for identifying each communication terminal serving as the receiver in the CJT. The "SS indices (SS Index #1 to SS Index #$N_{STA}$)" includes information indicating the number of streams to be transmitted to the communication terminals indicated by the respective AIDs in the L$_2$nd CJT.

The "magnitude" of the "update parameter" includes information regarding $\gamma_1^{(k, i, L1, L2)}, \ldots, \gamma_{n(i)}^{(k, i, L1, L2)}$ in Expression 12. The "kernel vector" of the "update parameter" includes information regarding the matrix $U_-^{(k)}$ in Expression 12. That is, the "kernel vector" includes information regarding the eigenvector of the channel.

For the arbitrary number p, the "magnitude #p" of the "update parameter" may include information indicating the value obtained in Expression 5. Further, similarly, for an arbitrary number u, a "kernel vector #U" may include information indicating a vector obtained in Expression 13.

$$U_-^{(n_u)} u=1,2,\ldots,N_r \quad \text{EXPRESSION 13}$$

Here, $N_r$ may be determined on the basis of values of the "frequency band" and "grouping" in the "MIMO control".

Further, $n_u$ represents a number determined on the basis of u. For example, the number of subcarriers used in the OFDM modulation method is $N_F$, a natural number $N_g$ is indicated in the "grouping" in a frequency band indicated by the "frequency band", and $n_u$ is determined according to Expression 14 below.

[Math. 14]

$$n_u = \min\left((u - 1)\left\lceil \frac{N_F}{N_g} \right\rceil + 1, N_F\right) \quad \text{EXPRESSION 14}$$

Here, min(a, b) represents a minimum number with respect to arbitrary real numbers a and b. Further, "NF/Ng" represents a ceiling function with respect to the real numbers.

In the weight update 830, the shared AP notified of the weight update information 828 may calculate $w_i^{(k, L2)}$ in Expression 15 below and determine a CJT weight of the shared AP itself in the L$_2$nd time on the basis of the calculated $w_i^{(k, L2)}$. Here, the "magnitude" and "kernel vector" in the frame issued as the weight update information 828 include the information in Expression 5 and the information in Expression 13, respectively. Further, $N_{fr}$ in Expression 15 may satisfy Expression 6 above.

[Math. 14]

$$n_u = \min\left(\left(u - 1\left\lceil \frac{N_F}{N_g} \right\rceil + 1, N_F\right)\right) \quad \text{EXPRESSION 14}$$

Here, U(tilde)$_-^{(k)}$ in Expression 15 satisfies Expression 16, and G and D in Expression 16 satisfy Expression 17.

[Math. 15]

$$w_i^{(k,L_2)} = \left(I - \tilde{U}_-^{(k)} \tilde{U}_-^{(k)H}\right)^{-1} \quad \text{EXPRESSION 15}$$

$$\text{diag}\left[\sqrt{\frac{1}{N_{f_r} - N_{f_r-1}} \sum_{q=1+N_{f_r-1}}^{N_{f_r}} \gamma_m^{(q,i,L_1,L_2)}}, \ldots, \sqrt{\frac{1}{N_{f_r} - N_{f_r-1}} \sum_{q=1+N_{f_r-1}}^{N_{f_r}} \gamma_m^{(q,i,L_1,L_2)}}\right] \tilde{w}_{ij}^{(k,L_1)}$$

Here, $n_u^-$ represents a maximum $n_u$ that does not exceed k, $n_u^+$ represents a minimum $n_u$ that exceeds k, and Expression 17 is essentially an expression that describes $U_-^{n_u+}$ and a relationship with $U_-^{n_u+}$ in a Givens rotation.

Third Example

In a third example, the two AP #1 (101) and AP #2 (102) are included in the multi-APs 100, and four communication terminals STA #1 to STA #4 are connected to the multi-APs 100. Then, there will be described a case where the three STA #1 to STA #3 serve as receivers in the $L_1$st joint transmission and the four STA #1 to STA #4 serve as receivers in the $L_2$nd joint transmission. Here, $1 \leq L_1 < L_2$ is established. That is, unlike the second example described above, the third example shows an example where the number of terminals serving as the receivers in the $L_2$nd joint transmission is smaller than the number of terminals serving as the receivers in the $L_1$st joint transmission.

At this time, using the Gram-Schmidt orthogonalization process allows $W^{(k, L1)}$ and $W^{(k, L2)}$ to have a relationship in Expression 18.

[Math. 16]

EXPRESSION 16

$$\tilde{U}_-^{(k)} = \begin{cases} U_-^{(n_u)} & \text{if } f = n_u \; u = 1, \ldots, N_r \\ \prod_{\delta=1}^{N_r}\left(\prod_{a=\delta}^{N_c}\left\{G\left(N_c + 1 - a, \beta, \frac{k - n_u^-}{n_u^+ - n_u^-}\theta_{N_c+1-a,b}\right)\right\}\right)D\left(\delta, \frac{k - n_u^-}{n_u^+ - n_u^-}\right)U_-^{n_u^-} & \text{otherwise} \end{cases}$$

[Math. 17]

EXPRESSION 17

$$U_-^{n_u^+} = \prod_{\delta=1}^{N_r}\left(\prod_{a=\delta}^{N_c}\left\{G(N_c + 1 - a, \beta, \theta_{N_c+1-a,b})\right\}\right)D(\delta, 1)U_-^{n_u^-}$$

$$\text{s.t.} \;\; (a, b, \theta)_{x,y} = \begin{cases} \cos\theta & \text{if } f(x, y) = (a, a) \text{ or } (x, y) = (b, b) \\ \sin\theta & \text{if } f = b, y = a \\ -\sin\theta & \text{if } f = a, y = b \\ 1 & \text{if } f = y \\ 0 & \text{otherwise} \end{cases}$$

$$D(c, \varepsilon) = \begin{bmatrix} I_{c-1} & & & 0 \\ & e^{j\varepsilon\varepsilon_c^{(c)}} & & \\ & & \ddots & \\ & & & e^{j\varepsilon\varepsilon_{N_r-1}^{(c)}} \\ 0 & & & 1 \end{bmatrix},$$

Here, $U_+^{(k)}{}_{(i)}$ represents the i-th row of $U_+^{(k)}{}_{(i)}$. Further, $N_1$ represents the number of columns of $w_i^{(k, L1)}$, $N_2$ represents the number of columns of $w_i^{(k, L2)}$, and $N_{STA}(L_2 \cap L_1)$ represents a set of all communication terminals serving as the receivers common to the $L_1$st joint transmission and the $L_2$nd joint transmission.

Further, in $j \in N_{STA} (L_2 \cap L_1)$, the real number $\gamma_m^{(k, i, L1, L2)}$ represents a power ratio of the CJT weight in the m-th stream of $w_i^{(k, L1)}$ to the CJT weight in the m-th stream of $w_i^{(k, L2)}$ and, in $j \notin N_{STA} (L_2 \cap L_1)$, the real number represents transmission power with respect to the CJT weight in the m-th stream of $w_i^{(k, L2)}$.

Further, $U_+^{(k)}$ represents a matrix having, as a column vector, an eigenvector whose eigenvalue is not 0 with respect to channel matrices of the multi-APs and STA #4 in a vector space that is a kernel space with respect to the channel matrices of the multi-APs and the STA #1 to STA #3 at the k-th frequency.

$U_+^{(k)}$ can be calculated on the basis of the feedback of the channel state information from the communication terminals. This point is similar to that in the second example described above.

At this time, Expression 18 above can be regarded as an update expression for deriving $W^{(k, L2)}$ from $W^{(k, L1)}$.

$U_+^{(k)}$ is determined on the basis of the feedback of the channel state information from the communication terminals. Further, square roots of $\gamma_1^{(k, i, L1, L2)}, \ldots, \gamma_{n(i)}^{(k, i, L1, L2)}$ are determined by the sharing AP. Therefore, $W^{(k, L2)}$ can be obtained by Expression 18 in the update information generation 827.

A frame configuration issued as the $L_2$nd update information notification according to the third example of the embodiment of the present technology is similar to that in the second example described above. However, contents of values included therein are different as described below.

The "magnitude" of the "update parameter" includes information regarding $\gamma_1^{(k, i, L1, L2)}, \ldots, \gamma_{n(i)}^{(k, i, L1, L2)}$ in Expression 19. The "kernel vector" of the "update parameter" includes information regarding $U_+^{(k)}$ in Expression 19.

For the arbitrary number p, the "magnitude #p" of the "update parameter" may include information indicating a value obtained by applying Expression 5 to $\gamma_m^{(k,\,i,\,L1,\,L2)}$, ..., and $\gamma_{n(i)}^{(k,\,i,\,L1,\,L2)}$ in Expression 19. Further, similarly, for the arbitrary number u, the "kernel vector #U" may include information indicating a vector obtained in Expression 19.

$$U_+^{(n_u)} u=1,2,\ldots,N_r \qquad \text{EXPRESSION 19}$$

Here, $N_r$ may be determined on the basis of values of the "frequency band" and "grouping" in the "MIMO control". For example, when the number of subcarriers used in the OFDM modulation method is $N_F$, a natural number $N_g$ is indicated in the "grouping" in a frequency band indicated by the "frequency band", and $N_{f_r}$ determined in Expression 6 is used, $n_u$ may be determined according to Expression 14.

In the weight update 830, the shared AP notified of the weight update information 828 may calculate $w_i^{(k,\,L2)}$ in Expression 20 below and determine a CJT weight of the shared AP itself in the $L_2$nd time on the basis of the calculated $w_i^{(k,\,L2)}$. Here, the "magnitude" and "kernel vector" in the frame issued as the weight update information 828 include the information in Expression 5 and the information in Expression 19, respectively. Further, $N_{f_r}$ in Expression 21 may satisfy Expression 6 above.

[Math. 20]

EXPRESSION 20

$$w_i^{(k,L_2)} = \begin{cases} \text{diag}\left[\sqrt{\dfrac{1}{N_{f_r}-N_{f_{r-1}}}\sum_{q=1+N_{f_{r-1}}}^{N_{f_r}}\gamma_m^{(q,i,L_1,L_2)}},\,\ldots\,,\sqrt{\dfrac{1}{N_{f_r}-N_{f_{r-1}}}\sum_{q=1+N_{f_{r-1}}}^{N_{f_r}}\gamma_m^{(q,i,L_1,L_2)}}\right]\left\{w_i^{(k,L_2)} - \tilde{U}_+^{(k)}\left(\tilde{U}_+^{(k)H}w_i^{(k,L_2)}\right)\right\} & \text{if } f \in N_{STA}(L_2 \cap L_1) \\ \text{diag}\left[\sqrt{\gamma_{N_1+1}^{(k,i,L_1,L_2)}},\,\ldots\,,\sqrt{\gamma_{N_2}^{(k,i,L_1,L_2)}}\right]\tilde{U}_{+(i)}^{(k)} & \text{otherwise} \end{cases}$$

$$\text{s.t. } \{w_{i,j}^{(k,L)}\} = w_i^{(k,L)},\, i=1,\ldots,N_{AP}$$

Here, $\tilde{U}_+^{(k)}$ in Expression 20 satisfies Expression 21, and G and D in Expression 21 satisfy Expression 22.

[Math. 21]

EXPRESSION 21

$$\tilde{U}_-^{(k)} = \begin{cases} U_-^{(n_u)} & \text{if } k = n_u \; u=1,\ldots,N_r \\ \prod_{\delta=1}^{N_r}\left(\prod_{a=\delta}^{N_c}\left\{G\left(N_c+1-a,\,\beta,\,\dfrac{k-n_u^-}{n_u^+-n_u^-}\theta_{N_c+1-a,b}\right)\right\}\right)D\left(\delta,\,\dfrac{k-n_u^-}{n_u^+-n_u^-}\right)U_+^{n_u^-} & \text{otherwise} \end{cases}$$

[Math. 22]

EXPRESSION 22

$$U_+^{n_u^+} = \prod_{\delta=1}^{N_r}\left(\prod_{a=\delta}^{N_c}\{G(N_c+1-a,\,\beta,\,\theta_{N_c+1-a,b})\}\right)D(\delta,\,1)U_+^{n_u^-}$$

$$\text{s.t. } G(a,b,\theta)_{x,y} = \begin{cases} \cos\theta & \text{if } f(x,y)=(a,a) \text{ or } (x,y)=(b,b) \\ \sin\theta & \text{if } f=b,\, y=a \\ -\sin\theta & \text{if } f=a,\, y=b \\ 1 & \text{if } f=y \\ 0 & \text{otherwise} \end{cases},$$

$$D(c,\varepsilon) = \begin{bmatrix} I_{c-1} & & & 0 \\ & e^{j\varepsilon\varepsilon_c^{(c)}} & & \\ & & \ddots & \\ & & & e^{j\varepsilon\varepsilon_{N_r-1}^{(c)}} \\ 0 & & & 1 \end{bmatrix},$$

Here, $n_u^-$ represents a maximum $n_u$ that does not exceed k, $n_u^+$ represents a minimum $n_u$ that exceeds k, and Expression 22 is essentially an expression that describes $U_+^{nu+}$ and a relationship with $U_+^{nu+}$ in a Givens rotation.

Fourth Example

In a fourth example, the two AP #1 (101) and AP #2 (102) are included in the multi-APs 100, and an arbitrary number of communication terminals including the STA #1 is connected to the multi-APs 100. Then, there will be described a case where arbitrary communication terminals serve as receivers in the List joint transmission and the STA #1 serves as a receiver in the $L_2$nd joint transmission. Here, $1 \leq L_1 < L_2$ is established. Note that, in the fourth example, not only the STA #1 but also a plurality of communication terminals may serve as receivers in the $L_2$nd joint transmission.

Similarly to the first example described above, the $L_2$nd CJT weight $W^{(k, L2)}$ at the k-th frequency can be expressed by Expression 3.

$W^{(k, L2)}$ is obtained on the basis of the feedback of the channel state information from the communication terminals in the update information generation 827.

Figure 8:
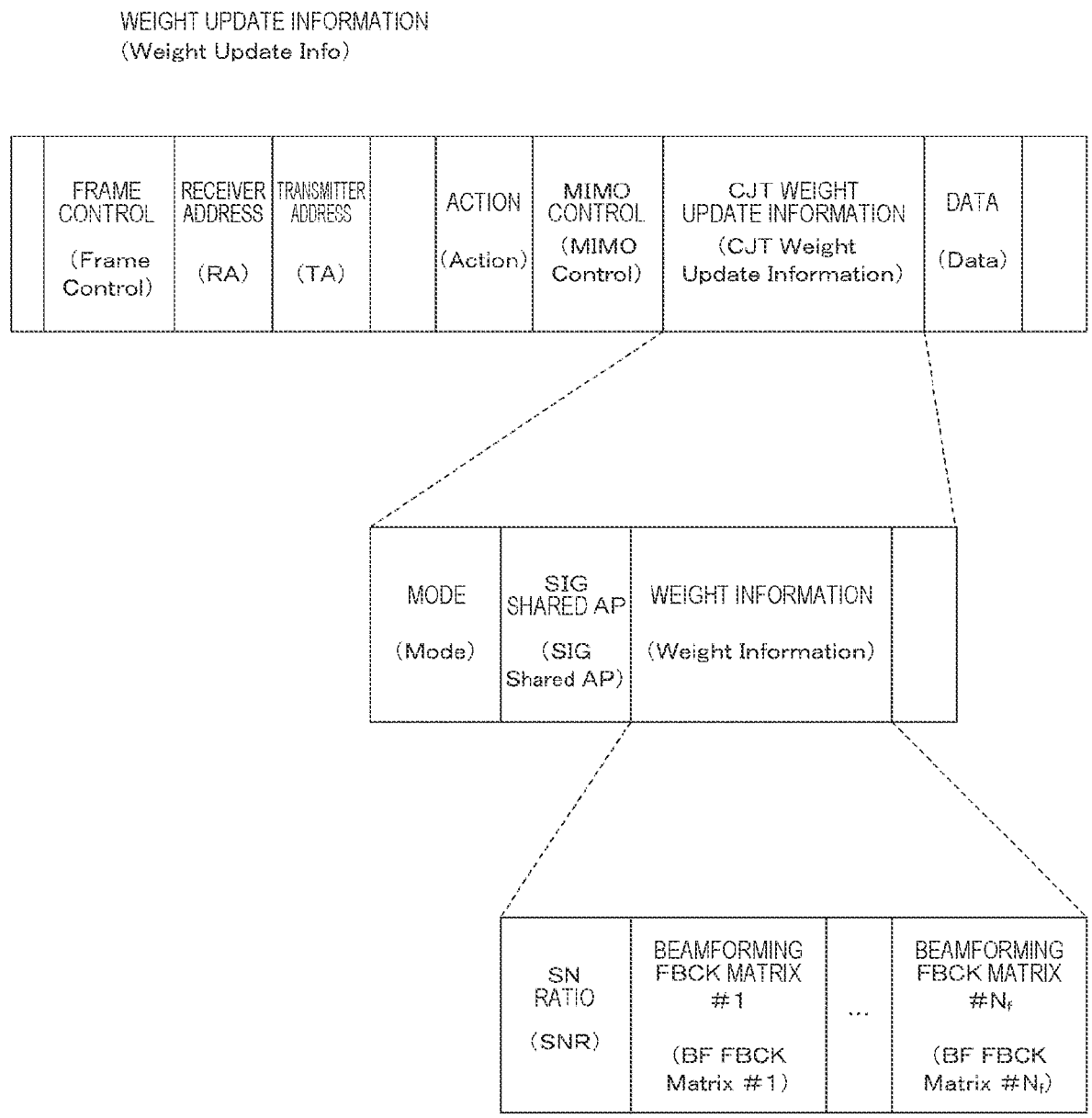
FIG. 8 shows a configuration example of a frame issued as weight update information performed immediately before $L_2$nd joint transmission according to a fourth example of an embodiment of the present technology.

FIG. 8 shows a configuration example of a frame issued as the weight update information performed immediately before the $L_2$nd joint transmission according to the fourth example in the embodiment of the present technology.

The "update parameter" is transmitted in the other examples described above, but the "weight information" is transmitted in the frame configuration in the fourth example. The "weight information" includes information regarding $W^{(k, L2)}$. The other fields are similar to those in the other examples described above.

As a specific example of the information included in the "mode", when the "mode" has a 2-bit length, the information may include "11" indicating that the frame corresponds to the frame in the fourth example.

Further, the "weight information" may include subfields of "SN ratio" and "beamforming FBCK matrices".

The "SN ratio (SNR)" includes information regarding transmission power with respect to the CJT weight. For example, the "SN ratio" includes information indicating $\Gamma$ in Expression 23.

[Math. 23]

$$\Gamma = \frac{1}{N_f} \sum_{r=1}^{N_f} \left\| W^{(N_{f_r}, L2)} \right\|^2 \qquad \text{EXPRESSION 23}$$

In the "beamforming FBCK matrices (BF FBCK Matrices #1 to #Nf)", when an arbitrary natural number is p, information indicating $W^{(N_{f_r}, L2)}$ in Expression 24 may be included in a "beamforming FBCK matrix #p". Alternatively, the "beamforming FBCK matrices" may include information indicating a matrix $U^{(N_{f_r}, L2)}$ obtained by normalizing $W^{(N_{f_r}, L2)}$ as in Expression 25.

[Math. 24]

$$W^{(N_{f_r}, L2)} \qquad \text{EXPRESSION 24}$$

$$r = 1, 2, \ldots, N_f$$

[Math. 25]

$$\text{EXPRESSION 25}$$

$$U^{(N_{f_r}, L2)} = \text{diag}\left[ \left\| w_1^{(N_{f_r}, L2)} \right\|^{-1}, \ldots, \left\| w_{N_c}^{(N_{f_r}, L2)} \right\|^{-1} \right] W^{(N_{f_r}, L2)}$$

$$r = 1, 2, \ldots, N_f$$

Here, in Expressions 23 and 25, $\|a\|$ for an arbitrary vector a represents Frobenius norm or Hilbert-Schmidt norm. Further, $w_i^{(N_{f_r}, L2)}$ represents the i-th row of $W^{(N_{f_r}, L2)}$.

Further, $N_{f_r}$ may be determined on the basis of values indicated by the "frequency band" and "grouping" in the "MIMO control". For example, in a case where the number of subcarriers used in the OFDM modulation method is $N_F$ and a natural number $N_g$ is indicated in the "grouping" in a frequency band indicated by the "frequency band", $N_{f_r}$ may be determined to satisfy Expression 6.

Note that, in a case where the "beamforming FBCK matrices" are represented by Expression 24, the "SN ratio" field does not necessarily need to exist.

A format of the information indicated by the "beamforming FBCK matrix #p" may conform to a format of a compressed beamforming report or non-compressed beamforming report in "IEEE 802.11-2016" or a CSI report. The same applies to the information indicated by the "SN ratio".

In a case where, in the frame issued as the weight update information 828, the "SN ratio" includes the information indicating $\Gamma$ in Expression 23 and the "beamforming FBCK matrices" include information indicating Expression 25, the shared AP on which the weight update information 828 has been performed may calculate $\tilde{W}^{(k)}$ in Expression 26 below and use the calculated value as a CJT weight of the shared AP itself in the $L_2$nd time in the weight update 830. Here, $N_{f_r}$ in Expression 26 may satisfy Expression 6.

[Math. 26]

$$\text{EXPRESSION 26}$$

$$\tilde{W}^{(k)} = \begin{cases} \Gamma U_-^{(n_u)} & \text{if } f = n_r \; r = 1, \ldots, N_r \\ \prod_{\delta=1}^{N_r} \left[ \prod_{a=\delta}^{N_c} \left\{ G\left(N_c + 1 - a, \beta, \frac{k - n_r^-}{n_r^+ - n_r^-} \theta_{N_c + 1 - a, b} \right) \right\} \right] D\left(\delta, \frac{k - n_r^-}{n_r^+ - n_r^-}\right) U_+^{n_r^+} & \text{otherwise} \end{cases}$$

Here, $U^{nr+}$ in Expression 26 satisfies Expression 27.

[Math. 27]

EXPRESSION 27

$$U^{n_r^+}_r = \prod_{\delta=1}^{N_r}\left(\prod_{a=\delta}^{N_c}\{G(N_c+1-a, \beta, \theta_{N_c+1-a,b})\}\right) D(\delta, 1) U^{n_r^-}_r$$

s.t. $(a, b, \theta)_{x,y} = \begin{cases} \cos\theta & \text{if } f(x,y) = (a,a) \text{ or } (x,y) = (b,b) \\ \sin\theta & \text{if } f = b, y = a \\ -\sin\theta & \text{if } f = a, y = b \\ 1 & \text{if } f = y \\ 0 & \text{otherwise} \end{cases}$, $$D(c, \varepsilon) = \begin{bmatrix} I_{c-1} & & & 0 \\ & e^{j\varepsilon\varepsilon_c^{(c)}} & & \\ & & \ddots & \\ & & & e^{j\varepsilon\varepsilon_{N_r-1}^{(c)}} \\ 0 & & & 1 \end{bmatrix},$$

Here, $U^{(k)}$ represents a normal vector of the CJT weight for the multi-APs and STA #1 at the k-th frequency, and $\Gamma$ represents a coefficient for correcting the CJT weight from the normal vector to desired transmission power. Further, $n_r^-$ represents a maximum $n_r$ that does not exceed k, $n_r^+$ represents a minimum $n_r$ that exceeds k, and Expression 27 is essentially an expression that describes $U^{n_r+}$ and a relationship with $U^{n_r-}$ in a Givens rotation.

[Standard of Selecting Each Example]

Figure 9:
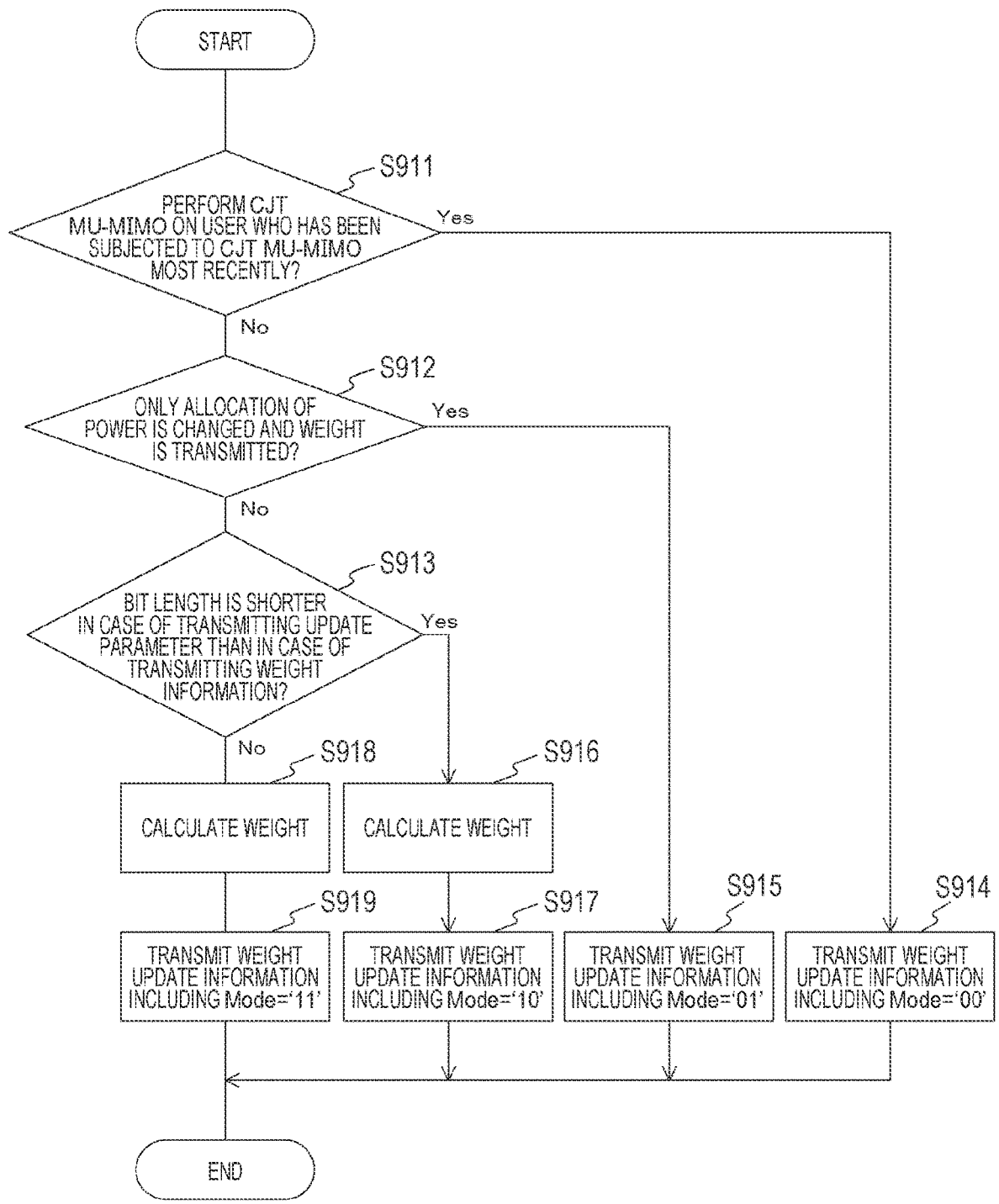
FIG. 9 is a flowchart showing an example of a processing procedure performed when each example in an embodiment of the present technology is selected.

FIG. 9 is a flowchart showing an example of a processing procedure performed when each example in the embodiment of the present technology is selected.

Here, there will be described a selection standard for generating the "CJT weight update information" of the "weight update information" frame in the sharing AP in a case where weights are selectively updated as in the first to fourth examples. Examples of the frame of the "CJT weight update information" have been described in the first to fourth examples, but an amount of information issued as the "weight update information" and communication quality of the $L_2$nd joint transmission performed on the basis of the issued information vary depending on a situation of a change in communication terminals serving as receivers in the $L_1$st joint transmission and the $L_2$nd joint transmission. In view of the above circumstances, the following processing procedure shows an example of the selection standard for transmitting an optimal frame of the "weight update information".

A sharing AP that has started the update information generation 827 determines whether or not to use the same weights as those in "CJT DL MU MIMO" that has been performed most recently (step S911). Here, the "most recently" may mean a case where channel state information held by the sharing AP is acquired within a certain threshold time period. The threshold may be changed every time the weight update 830 is performed, and, for example, there is a case where an error is accumulated because of the weight update 830. Note that the weights in the most recently performed "CJT DL MU MIMO" are already held by a shared AP.

The sharing AP, which has determined that the "CJT DL MU MIMO" is performed by using the same weights as those in the most recently performed "CJT DL MU MIMO" (step S911: Yes), causes the "mode" of the frame issued as the weight update information 828 to include information indicating that the frame described in the first example is transmitted and generates and transmits the frame described in the first example (step S914). Here, in a case where the "mode" is expressed by a 2-bit length, "00" may be stored. A shared AP notified of the frame updates the weights according to the "weight update information" described in the first example.

However, in this case, the fields of the "SIG shared AP" and the "update parameter" are not included in the "CJT weight update information" in the frame issued as the weight update information 828. The shared AP notified of the frame generates a past weights indicated in the "base weight" as weights for the next "CJT DL MU MIMO" on the basis of the information included in the "mode" and "base weight".

Note that, when the "CJT DL MU MIMO" is performed in the next joint transmission, the information indicated in the "base weight" may be information indicating weights having a small difference in the number of communication terminals serving as receivers among weights used in the past. Further, similarly, the information may be information indicating weights having a small difference in the number of communication terminals serving as receivers in the weight update information 828 issued in the past.

The sharing AP, which has determined not to use the most recently performed "CJT DL MU MIMO" and the weights, determines whether to change allocation of transmission power with respect to the most recently used weights and perform the "CJT DL MU MIMO" (step S912). A determination criterion here may be, for example, a case where a held communication traffic for each communication terminal is different from the most recent communication traffic.

The sharing AP, which has determined that the allocation of the transmission power is changed and the "CJT DL MU MIMO" is performed (step S912: Yes), causes the "mode" of the frame issued as the weight update information 828 to include information indicating that the frame described in the first example is transmitted and generates and transmits the frame described in the first example (step S915). Here, in a case where the "mode" is expressed by a 2-bit length, "01" may be stored, and the shared AP notified of the frame updates the weights according to the "weight update information" described in the first example.

In this case, the fields of the "SIG shared AP" and the "update parameter" are included in the "CJT weight update information" in the frame issued as the weight update information 828. Based on the information included in the "mode" and "base weight", a frame notified of the frame generates weights to which desired transmission power is allocated on the basis of the information indicated in the "update parameters" as weights for the next "CJT DL MU MIMO" with respect to the past weights indicated in the "base weight".

The sharing AP, which has determined not to use the most recently performed "CJT DL MU MIMO" and the weights and not to change the allocation of the transmission power with respect to the most recently used weights and perform the "CJT DL MU MIMO", estimates an amount of information of the frames in the configuration examples of the second to fourth examples (step S913).

For example, in a case where the most recently used weights have been transmitted to the STA #1 to the STA #3, but communication terminals serving as receivers in the next joint transmission are only the STA #1 and the STA #2 as in the second example, an amount of information of the "update parameters" described in the second example and an amount of information of the "weight information" described in the fourth example are estimated.

Further, for example, in a case where the most recently used weights have been transmitted to the STA #1 to the STA #3, but communication terminals serving as receivers in the next joint transmission are the STA #1 to the STA #4 as in the second example, the amount of information of the "update parameters" described in the third example and the amount of information of the "weight information" described in the fourth example are estimated.

In a case where it is determined that the amount of information to be transmitted as the "update parameter" is small (step S913: Yes), weights to be stored in the "update parameter" are calculated (step S916). Then, information indicating that the frame described in the second example or third example is transmitted is included in the "mode" of the frame issued as the weight update information 828, and the frame described in the second example or third example is generated and transmitted (step S917). Here, in a case where the "mode" is expressed by a 2-bit length, "10" may be stored, and the shared AP notified of the frame updates the weights according to the "weight update information" described in the second example or third example.

Meanwhile, in a case where it is determined that the amount of information to be transmitted as the "weight information" is small (step S913: No), weights to be stored in the "weight information" are calculated (step S918). Then, information indicating that the frame described in the fourth example is transmitted is included in the "mode" of the frame issued as the weight update information 828, and the frame described in the fourth example is generated and transmitted (step S919). Here, in a case where the "mode" is expressed by a 2-bit length, "11" may be stored, and the shared AP notified of the frame updates the weights according to the "weight update information" described in the fourth example.

Note that the shared AP notified of the frame may determine whether the frame is the frame in the second example or the frame in the third example on the basis of the information indicated by the "base weight" and the information included in the "SIG shared AP".

For example, in a case where the past weights indicated by the "base weight" are the weights for the STA #1 to STA #3 and the AID included in the "SIG shared AP" includes information indicating only the STA #1 and STA #2, it may be determined that the frame is the frame in the second example.

Further, for example, in a case where the past weights indicated by the "base weight" are weights for the STA #1 to STA #3 and the AID included in the "SIG shared AP" includes information indicating the STA #1 to STA #3 and another communication terminal, it may be determined that the frame is the frame in the third example.

Note that, in a case where the APs serving as receivers in the capability exchanges 811 and 812 are notified that only the first example or the fourth example can be performed in the weight update 830, the frames of the configuration examples described in the second example or the third example may not be transmitted, and only other frames may be transmitted.

In this case, the sharing AP, which has determined not to use the most recently performed "CJT DL MU MIMO" and the weights and not to change the allocation of the transmission power to the most recently used weights and perform the "CJT DL MU MIMO", causes the "mode" of the frame issued as the weight update information 828 to include information indicating that the frame described in the second example is transmitted and generates the frame described in the fourth example. Here, in a case where the "mode" is expressed by a 2-bit length, "11" may be stored, and the shared AP notified of the frame updates the weights according to the "weight update information" described in the fourth example.

As described above, according to the embodiment of the present technology, when the multi-APs perform joint transmission, the sharing AP transmits the update information notification 828 to the shared AP. Therefore, the sharing AP and the shared AP can perform joint transmission by using common weights.

Note that the above embodiment shows examples for embodying the present technology, and the matters in the embodiment and the matters specifying the invention in the claims have a corresponding relationship. Similarly, the matters specifying the invention in the claims and the matters in the embodiment of the present technology represented by the same names as those in the matters specifying the invention in the claims have a corresponding relationship. However, the present technology is not limited to the embodiment and can be embodied by applying various modifications to the embodiment within the gist thereof.

Further, the processing procedure described in the above embodiment may be regarded as a method having a series of the above procedures, or may be regarded as a program for causing a computer to execute the series of procedures or a recording medium storing the program. The recording medium can be, for example, a compact disc (CD), a MiniDisc (MD), a digital versatile disc (DVD), a memory card, a Blu-ray (registered trademark) disc, or the like.

Note that the effects described in this specification are merely examples and are not limited, and other effects may be exerted.

Note that the present technology may also have the following configurations.

(1) A wireless base station including:
 a wireless control unit configured to generate weight update information for updating a first weight to a second weight, the first weight being a weight used in joint transmission previously performed with another wireless base station, the second weight being a weight used for performing the joint transmission after the joint transmission using the first weight; and
 a communication unit configured to notify the another wireless base station of the weight update information.

(2) The wireless base station according to (1), in which
 the wireless control unit generates capability information for determining whether or not the joint transmission can be performed in the wireless base station and regarding an algorithm usable for updating the first weight to the second weight, and
 the communication unit notifies the another wireless base station of the capability information.

(3) The wireless base station according to (1) or (2), in which
 the wireless control unit generates target data for performing the joint transmission by using the second weight, and
 the communication unit transmits the weight update information including the target data to the another wireless base station.

(4) The wireless base station according to (3), in which
 the weight update information includes information indicating that the weight update information includes the target data.

(5) The wireless base station according to any one of (1) to (4), in which
  the weight update information includes information for updating the weight to the second weight for the another wireless base station and for each receiver terminal of the joint transmission and further includes index information for identifying the another wireless base station and each receiver terminal.
(6) The wireless base station according to (5), in which
  the index information includes information regarding the number of the other wireless base stations and information for identifying each of the other wireless base stations.
(7) The wireless base station according to (5) or (6), in which
  the weight update information includes information regarding the number of receiver terminals, information for identifying each of the receiver terminals, and information regarding communication streams individually allocated to the receiver terminals.
(8) The wireless base station according to any one of (1) to (7), in which
  the weight update information includes at least one of the first weight, a parameter for converting the first weight into the second weight, or the second weight.
(9) The wireless base station according to (8), in which
  the weight update information further includes mode information indicating which of the first weight, the parameter for converting the first weight into the second weight, and the second weight the weight update information includes.
(10) The wireless base station according to (8) or (9), in which
  the parameter includes information regarding transmission power for the joint transmission.
(11) The wireless base station according to any one of (8) to (10), in which
  the parameter includes information regarding an eigenvector of a channel for a terminal serving as a receiver of the joint transmission using the first weight and not serving as a receiver of the joint transmission using the second weight.
(12) The wireless base station according to any one of (8) to (10), in which
  the parameter includes information regarding an eigenvector of a channel for a terminal serving as a receiver of the joint transmission using the second weight and not serving as a receiver of the joint transmission using the first weight.
(13) A wireless base station including:
  a communication unit configured to receive weight update information from another wireless base station that has previously performed joint transmission using a first weight; and
  a wireless control unit configured to update the first weight to a second weight on the basis of the weight update information, the second weight being used for the joint transmission after the joint transmission using the first weight.
(14) The wireless base station according to (13), in which
  the wireless control unit generates capability information for determining whether or not the joint transmission can be performed in the wireless base station and regarding an algorithm useable for updating the first weight to the second weight, and
  the communication unit notifies the another wireless base station of the capability information.
(15) The wireless base station according to (13) or (14), in which
  in a case where the weight update information includes target data for performing the joint transmission by using the second weight, the wireless control unit extracts the target data.
(16) The wireless base station according to (15), in which
  in a case where the weight update information includes information indicating that the weight update information includes the target data, the wireless control unit extracts the target data.
(17) The wireless base station according to any one of (13) to (16), in which
  the weight update information includes information for updating the weight to the second weight for the another wireless base station and for each receiver terminal of the joint transmission and further includes index information for identifying the another wireless base station and each receiver terminal, and
  the wireless control unit identifies each piece of information for updating the weight to the second weight on the basis of the index information.
(18) The wireless base station according to (17), in which
  the index information includes information regarding the number of the other wireless base stations and information for identifying each of the other wireless base stations.
(19) The wireless base station according to (17) or (18), in which
  the weight update information includes information regarding the number of receiver terminals, information for identifying each of the receiver terminals, and information regarding communication streams individually allocated to the receiver terminals.
(20) The wireless base station according to any one of (13) to (19), in which
  the weight update information includes at least one of the first weight, a parameter for converting the first weight into the second weight, or the second weight.

REFERENCE SIGNS LIST

100 Multi-access points (multi-APs)
101, 102 Access point (AP)
201 to 205 Communication terminal (STA)
210, 220 Communication terminal group (STAB)
300 Wireless communication apparatus
310 Communication unit
311 Wireless control unit
312 Data processing unit
313 Modulation/demodulation unit
314 Signal processing unit
315 Channel estimation unit
316 Wireless interface unit
317 Amplifier unit
319 Antenna
321 Control unit
322 Power supply unit
811, 812 Capability exchange
814, 825 Data sharing
818 Weight sharing
821, 831 Joint transmission trigger
822, 832 Joint transmission
823 Trigger
824 ACK
827 Update information generation
828 Update information notification
830 Weight update

The invention claimed is:

1. A first wireless base station, comprising:
a wireless control unit configured to generate weight update information to update a first weight to a second weight, wherein
the first wireless base station is configured to:
perform a first joint transmission with a second wireless base station based on the first weight; and
perform a second joint transmission with the second wireless base station based on the second weight,
the second joint transmission is subsequent to the first joint transmission, and
the weight update information includes:
information to update the first weight to the second weight, wherein the information to update the first weight is for the second wireless base station and a receiver terminal of the second joint transmission, and
index information that identifies the second wireless base station and the receiver terminal; and
a communication unit configured to notify the second wireless base station of the weight update information.

2. The first wireless base station according to claim 1, wherein
the wireless control unit is further configured to generate capability information to determine whether the first joint transmission can be performed in the first wireless base station,
the capability information is regarding an algorithm usable to update the first weight to the second weight, and
the communication unit is further configured to notify the second wireless base station of the capability information.

3. The first wireless base station according to claim 1, wherein
the wireless control unit is further configured to generate target data for the second joint transmission, and
the communication unit is further configured to transmit the weight update information including the target data to the second wireless base station.

4. The first wireless base station according to claim 3, wherein the weight update information further includes information indicating that the weight update information includes the target data.

5. The first wireless base station according to claim 1, wherein the index information includes:
information regarding a number of second wireless base stations including the second wireless base station, and
information that identifies each of the second wireless base stations.

6. The first wireless base station according to claim 1, wherein the weight update information further includes:
information regarding a number of receiver terminals including the receiver terminal,
information that identifies each of the receiver terminals, and
information regarding communication streams individually allocated to the receiver terminals.

7. The first wireless base station according to claim 1, wherein the weight update information further includes at least one of the first weight, a parameter to convert the first weight into the second weight, or the second weight.

8. The first wireless base station according to claim 7, wherein the weight update information further includes mode information indicating which of the first weight, the parameter, and the second weight the weight update information includes.

9. The first wireless base station according to claim 7, wherein the parameter includes information regarding transmission power for the second joint transmission.

10. The first wireless base station according to claim 7, wherein the parameter includes information regarding an eigenvector of a channel for a terminal serving as a receiver of the first joint transmission and not serving as a receiver of the second joint transmission.

11. The first wireless base station according to claim 7, wherein the parameter includes information regarding an eigenvector of a channel for the receiver terminal serving as a receiver of the second joint transmission and not serving as a receiver of the first joint transmission.

12. A first wireless base station, comprising:
a communication unit configured to receive weight update information from a second wireless base station, wherein
the first wireless base station is configured to perform a first joint transmission with the second wireless base station based on a first weight,
the weight update information includes:
information to update the first weight to a second weight, wherein the information to update the first weight for the first wireless base station and a receiver terminal of a second joint transmission, and
index information that identifies the first wireless base station and the receiver terminal; and
a wireless control unit configured to:
identify each piece of information of a plurality of pieces of information in the weight update information based on the index information; and
update the first weight to the second weight based on the identification of the each piece of information, wherein
the first wireless base station is further configured to perform the second joint transmission with the second wireless base station based on the second weight, and
the second joint transmission is subsequent to the first joint transmission.

13. The first wireless base station according to claim 12, wherein
the wireless control unit is further configured to generate capability information to determine whether the first joint transmission can be performed in the first wireless base station,
the capability information is regarding an algorithm usable to update the first weight to the second weight, and
the communication unit is further configured to notify the second wireless base station of the capability information.

14. The first wireless base station according to claim 12, wherein
the weight update information further includes target data to perform the second joint transmission, and
the wireless control unit is further configured to extract the target data.

15. The first wireless base station according to claim 14, wherein the weight update information further includes information indicating that the weight update information includes the target data, and the wireless control unit is further configured to extract the target data based on the information indicating that the weight update information includes the target data.

16. The first wireless base station according to claim 12, wherein the index information includes:
   information regarding a number of first wireless base stations including the first wireless base station, and
   information that identifies each of the first wireless base stations.

17. The first wireless base station according to claim 12, wherein the weight update information further includes:
   information regarding a number of receiver terminals including the receiver terminal,
   information that identifies each of the receiver terminals, and
   information regarding communication streams individually allocated to the receiver terminals.

18. The first wireless base station according to claim 12, wherein the weight update information further includes at least one of the first weight, a parameter to convert the first weight into the second weight, or the second weight.

19. A first wireless base station, comprising:
   a wireless control unit configured to:
      generate weight update information to update a first weight to a second weight, wherein
         the first wireless base station is configured to:
            perform a first joint transmission with a second wireless base station based on the first weight; and
            perform a second joint transmission with the second wireless base station based on the second weight,
         the second joint transmission is subsequent to the first joint transmission; and
      generate capability information to determine whether the first joint transmission can be performed in the first wireless base station,
         wherein the capability information is regarding an algorithm usable to update the first weight to the second weight; and
   a communication unit configured to notify the second wireless base station of the weight update information and the capability information.

* * * * *